US012709917B2

(12) United States Patent
Ufkes et al.

(10) Patent No.: US 12,709,917 B2
(45) Date of Patent: Aug. 18, 2026

(54) ELECTRONIC LOCKING SYSTEM WITH MECHANICAL OVERRIDE AND KEYLESS LOCKING SYSTEM

(71) Applicant: Security Enhancement Systems, LLC, Northbrook, IL (US)

(72) Inventors: Philip J. Ufkes, Sullivan's Island, SC (US); Matthew Frank Trapani, Deerfield, IL (US); Matthew Paul, Palatine, IL (US); Steven J. Malone, Mt. Pleasant, SC (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 188 days.

(21) Appl. No.: 18/737,603

(22) Filed: Jun. 7, 2024

(65) Prior Publication Data

US 2024/0401376 A1 Dec. 5, 2024

Related U.S. Application Data

(63) Continuation of application No. PCT/US2022/052285, filed on Dec. 8, 2022.
(Continued)

(51) Int. Cl.
*E05B 47/02* (2006.01)
*E05B 47/06* (2006.01)
(Continued)

(52) U.S. Cl.
CPC ........ *E05B 47/026* (2013.01); *E05B 47/0607* (2013.01); *E05B 49/004* (2013.01);
(Continued)

(58) Field of Classification Search
CPC .... E05B 47/02; E05B 47/026; E05B 47/0607; E05B 47/0657; E05B 47/0665;
(Continued)

(56) References Cited

U.S. PATENT DOCUMENTS 5,265,452 A * 11/1993 Dawson ................ E05B 17/042 70/277
5,782,118 A 7/1998 Chamberlain et al.
(Continued)

OTHER PUBLICATIONS

International search report, International application No. PCT/US22/52285. Date of mailing: May 23, 2023. ISA/US, Alexandria, VA.
(Continued)

*Primary Examiner* — Christopher J Boswell
(74) *Attorney, Agent, or Firm* — Gregory Finch; Finch Paolino, LLC

(57) ABSTRACT

An electronic access control system comprising an electronic lock assembly and a keyed lock assembly configured to mechanically override at least one locking component of the electronic lock assembly. In certain embodiments, the electronic lock assembly may be communicably engaged with one or more network devices to communicate an occurrence of a mechanical override at the electronic lock assembly. Certain aspects of the present disclosure provide for an electronic access control system comprising a keyless storage apparatus configured to securely store one or more physical assets. In certain embodiments, the keyless storage apparatus may be communicably engaged with at least one alarm system controller and/or remote server. The keyless storage apparatus may be configured to track a location status of one or more physical asset.

20 Claims, 21 Drawing Sheets

Related U.S. Application Data

(60) Provisional application No. 63/310,319, filed on Feb. 15, 2022, provisional application No. 63/289,505, filed on Dec. 14, 2021, provisional application No. 63/287,199, filed on Dec. 8, 2021.

(51) Int. Cl.
*E05B 49/00* (2006.01)
*E05B 45/06* (2006.01)
*E05B 47/00* (2006.01)

(52) U.S. Cl.
CPC . *E05B 2045/065* (2013.01); *E05B 2045/0695* (2013.01); *E05B 2047/0084* (2013.01)

(58) Field of Classification Search
CPC ..... E05B 2047/0067; E05B 2047/0069; E05B 2047/0084; E05B 2047/0088; E05B 49/002; E05B 49/004
See application file for complete search history.

(56) References Cited

U.S. PATENT DOCUMENTS

| | | | | |
|---|---|---|---|---|
| 6,116,067 | A * | 9/2000 | Myers | E05B 65/462 70/279.1 |
| 8,495,899 | B2 * | 7/2013 | Gartner | E05B 47/0603 70/281 |
| 9,316,024 | B2 * | 4/2016 | Münger | E05B 47/0001 |
| 10,487,544 | B2 * | 11/2019 | Ainley | G01D 5/145 |
| 11,021,894 | B1 * | 6/2021 | Zastrow | E05B 47/0012 |
| 11,434,663 | B2 * | 9/2022 | Ullrich | E05B 47/0603 |
| 11,585,118 | B2 * | 2/2023 | Lin | E05B 63/08 |
| 11,639,617 | B1 * | 5/2023 | Farber | E05B 47/02 70/278.7 |
| 12,012,776 | B2 * | 6/2024 | Blanchard | E05B 47/026 |
| 2003/0160681 | A1 | 8/2003 | Menard et al. | |
| 2005/0199022 | A1 * | 9/2005 | Friar | E05B 65/46 70/279.1 |
| 2005/0199026 | A1 * | 9/2005 | Geringer | E05B 47/0676 70/283 |
| 2006/0097874 | A1 | 5/2006 | Salesky et al. | |
| 2008/0238669 | A1 | 10/2008 | Linford | |
| 2009/0282879 | A1 | 11/2009 | Marcelle et al. | |
| 2013/0043973 | A1 | 2/2013 | Greisen et al. | |
| 2013/0298616 | A1 | 11/2013 | Ullrich et al. | |
| 2015/0240528 | A1 | 8/2015 | Mani et al. | |
| 2016/0049025 | A1 | 2/2016 | Johnson | |
| 2016/0113721 | A1 | 4/2016 | Seremjian et al. | |
| 2016/0326775 | A1 | 11/2016 | Johnson | |
| 2022/0381063 | A1 * | 12/2022 | Liao | E05B 47/0012 |

OTHER PUBLICATIONS

Written Opinion of the International Searching Authority, International application No. PCT/US22/52285. Date of mailing: May 23, 2023. ISA/US, Alexandria, VA.

Garcia, Flavio D. et al. "Lock It and Still Lose It—On the (In)Security of Automotive Remote Keyless Entry Systems." Proceedings of the 25th USENIX Security Symposium, pp. 929-944. vol. 53. Aug. 2016. USENIX Association.

* cited by examiner

ELECTRONIC LOCKING SYSTEM WITH MECHANICAL OVERRIDE AND KEYLESS LOCKING SYSTEM

CROSS-REFERENCE TO RELATED APPLICATIONS

This application is a continuation-in-part of PCT Application PCT/US22/52285, filed on Dec. 8, 2022, entitled "ELECTRONIC LOCKING SYSTEM WITH MECHANICAL OVERRIDE AND KEYLESS LOCKING SYSTEM," said application claiming priority benefit of U.S. Provisional Application Ser. No. 63/287,199, filed Dec. 8, 2021, entitled "ELECTRONIC LOCKING SYSTEM WITH MECHANICAL OVERRIDE"; and further claiming the priority of U.S. Provisional Application Ser. No. 63/289,505, filed Dec. 14, 2021, entitled "KEYLESS HIGH SECURITY VAULT APPARATUS"; and further claiming the priority of U.S. Provisional Application Ser. No. 63/310,319, filed Feb. 15, 2022, entitled "KEYLESS HIGH SECURITY VAULT APPARATUS AND SYSTEM"; the entireties of which are hereby incorporated herein at least by virtue of this reference.

FIELD

The present disclosure relates to the field of electronic access controls; in particular, an electronic access control apparatus and system with a mechanical override, an electronic access control apparatus and system with a keyless storage device, and methods thereof.

BACKGROUND

Cabinets, shelter doors, desk and cabinet drawers, locker doors, access panels and doors, mailboxes, dispensers and other secure situations often utilize relatively simple lock mechanisms known as cam locks for a primary locking system. In some cases, these cam locks move other mechanisms that are engaged with the door or drawer of the cabinet or engaged with other mechanisms that are linked to the door and drawer of the cabinet or multiple doors or drawers of the cabinet. For example, a cam lock on a cabinet door typically fits in a ¾ inch diameter D-shaped or double D-shaped hole and, at the back side of the cam lock cylinder unit, has a metal blade or arm called a cam that rotates when the key is turned, from a position disengaged from surrounding cabinet hardware to a position of engagement in a slot or behind a ledge of the surrounding cabinet hardware. Other locks, such as those for desk drawers, commonly referred as cabinet locks, involve a camming type action as the key and plug are rotated. The rotation causes a cam or nipple to move a deadbolt linearly to a locking or unlocking position or in the case of a spring-loaded latch or dead latch the rotation causes the cam or nipple to move a latch or dead latch to an unlocking position, and removing the key keeps the latch or dead latch in the extended locked position.

File cabinets often utilize cam locks, or a variation known as a plunger type lock in which a spring-loaded plunger/lock cylinder located in the top horizontal margin of the cabinet is configured to lock all drawers when pushed in. The use of a key releases the spring plunger to return to the outward position and unlock the drawers.

Locker and cabinet locks and shelter doors often have electronic locking devices configured to control access thereto, some of which utilize keypads and some of which utilize ID or non-volatile memory devices that work on contact (e.g., RFID) to release the lock. Others include smartphone applications wherein a phone is a key to reliably unlock cabinet and shelter doors (e.g., via near-field communication (NFC) and/or BLUETOOTH). However, these electronic locking devices may fail under certain conditions and a need exists to provide a solution to provide a mechanical override for such systems.

Certain access control scenarios include the requirement for public safety personnel to gain emergency access to a building during an emergency when the building is unoccupied. In such scenarios, public safety personnel need to obtain a key (e.g., a master key) to unlock one or more doors to enter the building. Currently, this scenario is typically managed by installing a small safe-like device on the exterior of a building provided by local governmental agencies, enclosing keys for the building in the device. Local public safety personnel are equipped with physical keys to open the safe-like device during an emergency, which allows them to retrieve the stored keys for the building and gain access thereto. Management of these keys can pose a challenge for public safety personnel and a need exists to improve the process for public safety personnel to gain access to these safe-like devices.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

Certain aspects of the present disclosure provide for an electronic access control system comprising a controller, an electronic lock assembly operably engaged with the controller, and a keyed lock assembly. In certain embodiments, the electronic lock assembly comprises an electronic actuator operably engaged with a locking mechanism configured to selectively restrict access to a door or an access point of an enclosure when the locking mechanism is configured in a locked configuration and selectively enable access to the door or the access point of the enclosure when the locking mechanism is configured in an unlocked configuration. In certain embodiments, the keyed lock assembly comprises a lock cylinder, a keyed lock driver operably coupled to the lock cylinder, and a flange extending from a distal end of the keyed lock driver. The electronic actuator may be configured to actuate the locking mechanism between the locked configuration and the unlocked configuration in response to a command signal from the controller. The keyed lock driver may be configured to receive a mechanical key at a proximal end of the keyed lock driver; and, upon receiving the mechanical key, the keyed lock driver may be configured to rotate the flange around an axis of the lock cylinder. Upon rotating the flange, the flange may be configured to operably interface with the electronic lock assembly to disengage the locking mechanism.

In accordance with certain embodiments of the electronic access control system, the controller may further comprise a processor, a data transfer interface (e.g., a wireless communications module) communicably engaged with the processor, and a non-transitory computer readable medium communicably engaged with the processor and comprising processor-executable instructions stored thereon that, when executed, command the processor to perform one or more operations. In certain embodiments, the one or more operations may comprise operations for receiving an electronic access code from an input device via the data transfer interface; processing the electronic access code to authorize an electronic access request; and in response to authorizing the electronic access request, commanding the electronic actuator to actuate the locking mechanism. In certain embodiments, the electronic lock assembly may further comprise a switch or a sensor communicably engaged with the controller, wherein the switch or the sensor is configured to detect at least one position of the flange when rotated by the keyed lock driver. The one or more operations of the processor may further comprise establishing a wireless communications interface with the input device, wherein the input device comprises a mobile electronic device; and/or establishing a wireless communications interface with at least one remote server.

In accordance with certain embodiments of the electronic access control system, the controller may be communicably engaged with at least one alarm system controller via the data transfer interface. In said embodiments, the one or more operations of the processor further comprise communicating a first command signal to the at least one alarm system controller in response to the switch or the sensor detecting a first position of the flange, wherein the at least one alarm system controller is configured to suppress at least one alarm for the door or the access point of the enclosure in response to the first command signal. In said embodiments, the one or more operations of the processor further comprise communicating an override signal to the at least one remote server in response to the flange disengaging the locking mechanism. The one or more operations of the processor may further comprise communicating a second command signal to the at least one alarm system controller in response to the switch or the sensor detecting a second position of the flange, wherein the at least one alarm system controller is configured to restore the at least one alarm for the door or the access point of the enclosure in response to the second command signal.

Further aspects of the present disclosure provide for an electronic access control apparatus comprising an electronic lock assembly and a keyed lock assembly. In certain embodiments, the electronic lock assembly comprises a controller, an electronic actuator operably engaged with the controller, a latching mechanism operably engaged with the electronic actuator, and a blocking plate configured to be operably interfaced with a handle of a door or an access point of an enclosure. In certain embodiments, the electronic actuator is configured to actuate the latching mechanism between a locked position and an unlocked position in response to a command signal from the controller. The blocking plate may be configured to be selectively interfaced with the latching mechanism when the latching mechanism is positioned in the locked position such that the blocking plate and the latching mechanism are operably configured to lock the handle of the door or the access point of the enclosure. In certain embodiments, the keyed lock assembly comprises a lock cylinder, a keyed lock driver operably coupled to the lock cylinder, and a flange extending from a distal end of the keyed lock driver. The keyed lock driver may be configured to receive a mechanical key at a proximal end of the keyed lock driver, wherein the proximal end of the keyed lock driver is configured to be operably installed on an exterior surface of the door or the access point of the enclosure. In accordance with certain embodiments, upon receiving the mechanical key, the keyed lock driver may be configured to rotate the flange around an axis of the lock cylinder. Upon rotating the flange in a first direction, the flange may be configured to apply force to the latching mechanism to position the latching mechanism from the locked position to the unlocked position. The lock driver may be configured to retain the mechanical key when the lock driver is rotated (e.g., from a first position to a second position).

In accordance with certain embodiments of the electronic access control apparatus, the electronic actuator may comprise a solenoid. The latching mechanism may comprise a retractable plunger operably engaged with the solenoid. In certain embodiments, the electronic lock assembly may comprise a protrusion (e.g., a pin or other structure) extending laterally from a surface of the electronic lock assembly, wherein the flange is configured to operably interface with the protrusion to apply the force to the latching mechanism to position the latching mechanism from the locked position to the unlocked position. In accordance with certain embodiments, upon rotating the flange in a second direction, the electronic actuator is configured to position the latching mechanism to the locked position. In certain embodiments, the electronic actuator comprises an electric motor comprising at least one gear and a driveline. The electronic lock assembly may comprise a switch or a sensor communicably engaged with the controller, wherein the switch or the sensor is configured to detect at least one position of the flange when rotated by the keyed lock driver.

In accordance with certain embodiments of the electronic access control apparatus, the controller may further comprise a processor, a data transfer interface (e.g., a wireless communications module) communicably engaged with the processor, and a non-transitory computer readable medium communicably engaged with the processor and comprising processor-executable instructions stored thereon that, when executed, command the processor to perform one or more operations. In certain embodiments, the one or more operations may comprise operations for receiving an electronic access code from an input device via the data transfer interface; processing the electronic access code to authorize an electronic access request; and in response to authorizing the electronic access request, commanding the electronic actuator to actuate the latching mechanism from the locked position to the unlocked position. The one or more operations of the processor may further comprise establishing a wireless communications interface with the input device, wherein the input device comprises a mobile electronic device. The one or more operations of the processor may further comprise establishing a wireless communications interface with at least one remote server.

Further aspects of the present disclosure may provide for an electronic access control method comprising one or more steps or operations for receiving (e.g., with a controller of an electronic lock assembly) an electronic access code from at least one input device via a data transfer interface; processing (e.g., with at least one processor) the electronic access code to authorize an electronic access request for the access point of the enclosure; commanding (e.g., with the controller) the electronic actuator to actuate the locking mechanism from the locked position to the unlocked position in response to authorizing the electronic access request with the least one processor; in response to not authorizing the electronic access request with the least one processor or in response to the electronic actuator failing to actuate the locking mechanism, receiving at a keyed lock assembly operably installed at the access point of the enclosure, a mechanical key, wherein the mechanical key is keyed to a lock driver of the keyed lock assembly; and, rotating, via the mechanical key, the lock driver in a first direction. In accordance with certain aspects of the method, the keyed lock assembly comprises a lock cylinder, the lock driver operably coupled to the lock cylinder, and a flange extending from a distal end of the lock driver, wherein upon rotating the lock driver in the first direction, the flange is rotated around an axis of the lock driver from a first position to a second position. In accordance with certain aspects of the method, upon rotating the flange to the second position, the flange is configured to apply force to at least one surface of the electronic lock assembly to actuate the locking mechanism from the locked position to the unlocked position. In accordance with certain aspects of the method, the electronic lock assembly is operably installed at an access point of an enclosure and configured to selectively restrict and enable access to the access point of the enclosure. The electronic lock assembly may comprise an electronic actuator and a locking mechanism operably engaged with the electronic actuator. The electronic actuator may be configured to actuate the locking mechanism between a locked position and an unlocked position in response to a command signal from the controller. In certain embodiments, the controller comprises a wireless communications module.

In accordance with certain aspects of the present disclosure, the electronic access control method may further comprise one or more steps or operations for establishing (e.g., with the controller via the wireless communications module) a wireless data transfer interface with the at least one input device, wherein the at least one input device comprises a mobile electronic device. The electronic access control method may further comprise one or more steps or operations for establishing (e.g., with the controller via the wireless communications module) a wireless data transfer interface with at least one remote server. The controller may be communicably engaged with at least one alarm system controller via the data transfer interface. The electronic access control method may further comprise one or more steps or operations for communicating (e.g., with the controller) a first command signal to the at least one alarm system controller in response to rotating the flange from the first position to the second position, wherein the electronic lock assembly comprises a switch or a sensor communicably engaged with the controller and configured to detect one or more position of the flange. The method may comprise one or more steps or operations for receiving (e.g., with the at least one alarm system controller) the first command signal. The method may comprise one or more steps or operations for suppressing (e.g., with the at least one alarm system controller) at least one alarm for the access point of the enclosure in response to receiving the first command signal. The method may comprise one or more steps or operations for communicating (e.g., with the controller) a second command signal to the at least one alarm system controller in response to rotating the flange from the second position to the first position. The method may comprise one or more steps or operations for receiving (e.g., with the at least one alarm system controller) the second command signal, and restoring (e.g., with the at least one alarm system controller) the at least one alarm for the access point of the enclosure in response to receiving the second command signal.

In accordance with certain aspects of the present disclosure, the electronic access control method may further comprise one or more steps or operations for receiving (e.g., with the controller via the wireless communications module) digital identification data stored on a radio-frequency identification tag in response to receiving the mechanical key at the keyed lock assembly, wherein the mechanical key comprises a radio-frequency identification tag comprising digital identification data stored thereon. The method may further comprise communicating (e.g., with the controller) the digital identification data to at least one alarm system controller via the data transfer interface. The method may further comprise receiving (e.g., with the at least one alarm system controller) the digital identification data; and processing (e.g., with the at least one alarm system controller) the digital identification data to authenticate at least one authorized access device or user associated with the digital identification data. The method may further comprise suppressing (e.g., with the at least one alarm system controller) at least one alarm for the access point of the enclosure in response to authenticating the at least one authorized access device or user associated with the digital identification data.

Further aspects of the present disclosure provide for an electronic access control system comprising at least one mobile electronic device and a keyless storage apparatus. In accordance with certain aspects of the present disclosure, the keyless storage apparatus comprises a housing comprising a top surface, a bottom surface and side walls defining an interior area; an access panel coupled to at least one surface of the housing; a locking assembly configured to selectively establish a locking interface between the access panel and the housing; an electronic actuator configured to actuate a locking mechanism of the locking assembly from a locked state to an unlocked state; a controller operably engaged with the electronic actuator to command the electronic actuator to actuate the locking mechanism from the locked state to the unlocked state. In accordance with certain embodiments, the controller comprises a network communications module (e.g., a wireless communications module), a processor communicably engaged with the network communications module, and at least one non-transitory computer readable medium communicably engaged with the processor, the at least one non-transitory computer readable medium comprising instructions stored thereon that, when executed, cause the processor to perform one or more operations. In accordance with certain embodiments, the one or more operations of the processor comprise operations for establishing a wireless data transfer interface with the at least one mobile electronic device via the network communications module; receiving a first wireless communication from the at least one mobile electronic device via the wireless data transfer interface, wherein the first wireless communication comprises electronic access credentials associated with an electronic access request from a user of the at least one mobile electronic device; authenticating the electronic access credentials; and commanding the electronic actuator to actuate the locking mechanism from the locked state to the unlocked state in response to successfully authenticating the electronic access credentials.

In accordance with certain embodiments, the electronic access control system comprises an alarm system controller communicably engaged with the controller via the network communications module. In said embodiments, the one or more operations of the processor may further comprise one or more operations for communicating at least one data signal to the alarm system controller in response to authenticating the electronic access credentials. In said embodiments, the alarm system controller may be configured to suppress an alarm for at least one access point of a secured location in response to receiving the at least one data signal from the controller of the keyless storage device. The electronic access control system may further comprise at least one remote server communicably engaged with the controller via the network communications module. In said embodiments, the one or more operations of the processor may further comprise one or more operations for communicating the electronic access credentials from the controller to the at least one remote server via the network communications module. The at least one remote server may be configured to authenticate the electronic access credentials and communicate an authentication status of the electronic access credentials to the controller via the network communications module.

In accordance with certain embodiments, the electronic access control system comprises at least one physical asset removably housed in the interior area of the keyless storage apparatus. In said embodiments, the at least one physical asset comprises a radio-frequency identification tag comprising digital identification data for the at least one physical asset stored thereon. In said embodiments, the controller of the keyless storage apparatus comprises a radio-frequency antenna communicably engaged with the processor, wherein the radio-frequency antenna is configured to receive a radio-frequency signal comprising the digital identification data from the radio-frequency identification tag. In accordance with said embodiments, the one or more operations of the processor may further comprise operations for determining a location status of the at least one physical asset in response to emitting at least one signal from the radio-frequency antenna. The one or more operations of the processor may also comprise operations for receiving a second wireless communication from the at least one mobile electronic device via the wireless data transfer interface, wherein the second wireless communication comprises a request from the user to actuate the locking mechanism from the unlocked state to the locked state. In certain embodiments, the one or more operations of the processor further comprise commanding the electronic actuator to actuate the locking mechanism from the unlocked state to the locked state according to the location status of the physical asset (e.g., upon determining that the physical asset is located within the interior area of the keyless storage apparatus).

Still further aspects of the present disclosure provide for an electronic access control apparatus comprising a housing comprising a top surface, a bottom surface and side walls defining an interior area; an access panel coupled to at least one surface of the housing; a locking assembly configured to selectively establish a locking interface between the access panel and the housing; an electronic actuator configured to actuate a locking mechanism of the locking assembly from a locked state to an unlocked state; and a controller operably engaged with the electronic actuator to command the electronic actuator to actuate the locking mechanism from the locked state to the unlocked state. In accordance with certain embodiments, the controller includes a network communications module, a processor communicably engaged with the network communications module, and at least one non-transitory computer readable medium communicably engaged with the processor and comprising instructions stored thereon that, when executed, cause the processor to perform one or more operations. In accordance with certain embodiments, the one or more operations may comprise operations for establishing a wireless data transfer interface with at least one mobile electronic device via the network communications module; receiving a first wireless communication from the at least one mobile electronic device via the wireless data transfer interface, wherein the first wireless communication comprises electronic access credentials associated with an electronic access request from a user of the at least one mobile electronic device; authenticating the electronic access credentials; and commanding the electronic actuator to actuate the locking mechanism from the locked state to the unlocked state in response to successfully authenticating the electronic access credentials.

In accordance with certain embodiments of the electronic access control apparatus, the housing is configured to be mounted to an exterior wall of a building. In certain embodiments, the controller comprises a radio-frequency identification reader communicably engaged with the processor. The radio-frequency identification reader may comprise a high frequency radio-frequency antenna configured to emit an electromagnetic interrogation pulse at a frequency of 13.56 MHz. In certain embodiments, the controller may be configured to automatically establish the wireless data transfer interface with the at least one mobile electronic device when the at least one mobile electronic device is positioned within a specified range of the controller (e.g., in response to receiving a BLUETOOTH advertisement from the mobile electronic device).

Still further aspects of the present disclosure provide for an electronic access control method comprising one or more steps or operations for establishing (e.g., with a mobile electronic device) a wireless data transfer interface between the mobile electronic device and a controller of a keyless storage apparatus; communicating (e.g., with the mobile electronic device via the wireless data transfer interface) electronic access credentials to the controller of the keyless storage apparatus; receiving (e.g., with the controller of the keyless storage apparatus via the wireless data transfer interface) the electronic access credentials; authenticating (e.g., with the controller) the electronic access credentials; and commanding (e.g., with the controller) the electronic actuator to actuate the locking mechanism from the locked state to the unlocked state in response to successfully authenticating the electronic access credentials. In accordance with certain aspects of the electronic access control method, the keyless storage apparatus comprises a housing comprising a top surface, a bottom surface and side walls defining an interior area; an access panel coupled to at least one surface of the housing; a locking assembly configured to selectively establish a locking interface between the access panel and the housing, and an electronic actuator configured to actuate a locking mechanism of the locking assembly from a locked state to an unlocked state in response to a command from the controller.

In accordance with certain embodiments, the electronic access control method may further comprise one or more steps or operations for communicating (e.g., with the mobile electronic device via a network interface) the electronic access credentials to a remote server communicably engaged with the mobile electronic device and the controller of the keyless storage apparatus. The method may further comprise one or more steps or operations for providing (e.g., with the remote server via the network interface) an authentication token to the mobile electronic device in response to successfully authenticating the electronic access credentials at the remote server. The method may further comprise one or more steps or operations for communicating (e.g., with the mobile electronic device via the wireless data transfer interface) the authentication token to the controller of the keyless storage apparatus. The method may further comprise one or more steps or operations for communicating (e.g., with the controller of the keyless storage apparatus via a network interface) at least one data signal to an alarm system controller in response to authenticating the electronic access credentials. The method may further comprise one or more steps or operations for suppressing (e.g., with the alarm system controller) an alarm for at least one access point of a secured location in response to receiving the at least one data signal from the controller of the keyless storage device. The method may further comprise one or more steps or operations for receiving (e.g., with the controller of the keyless storage device) a digital identification data from a radio-frequency identification tag of a physical asset being stored in the interior area of the keyless storage apparatus, wherein the keyless storage device comprises a radio-frequency identification reader communicably engaged with the controller. The method may further comprise one or more steps or operations for determining (e.g., with the controller of the keyless storage device) a location status of the physical asset in response to emitting at least one signal from the radio-frequency identification reader, wherein the radio-frequency identification reader comprises a radio-frequency antenna. The method may further comprise one or more steps or operations for receiving (e.g., with the controller of the keyless storage apparatus via the mobile electronic device or an input device of the keyless storage apparatus) a command to lock the keyless storage device. The method may further comprise one or more steps or operations for determining (e.g., with the controller of the keyless storage device via the radio-frequency identification reader) the physical asset is located in the interior area of the keyless storage apparatus. The method may further comprise one or more steps or operations for actuating (e.g., with the electronic actuator in response to a command signal from the controller) the locking mechanism from the unlocked state to the locked state in response to determining the physical asset is located in the interior area of the keyless storage apparatus.

The foregoing has outlined rather broadly the more pertinent and important features of the present invention so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent structures do not depart from the spirit and scope of the invention as set forth in the appended claims.

BRIEF DESCRIPTION OF DRAWINGS

The skilled artisan will understand that the figures, described herein, are for illustration purposes only. It is to be understood that in some instances various aspects of the described implementations may be shown exaggerated or enlarged to facilitate an understanding of the described implementations. In the drawings, like reference characters generally refer to like features, functionally similar and/or structurally similar elements throughout the various drawings. The drawings are not necessarily to scale, emphasis instead being placed upon illustrating the principles of the teachings. The drawings are not intended to limit the scope of the present teachings in any way. The system and method may be better understood from the following illustrative descriptions with reference to the following drawings in which.

DETAILED DESCRIPTION

Figure 1:
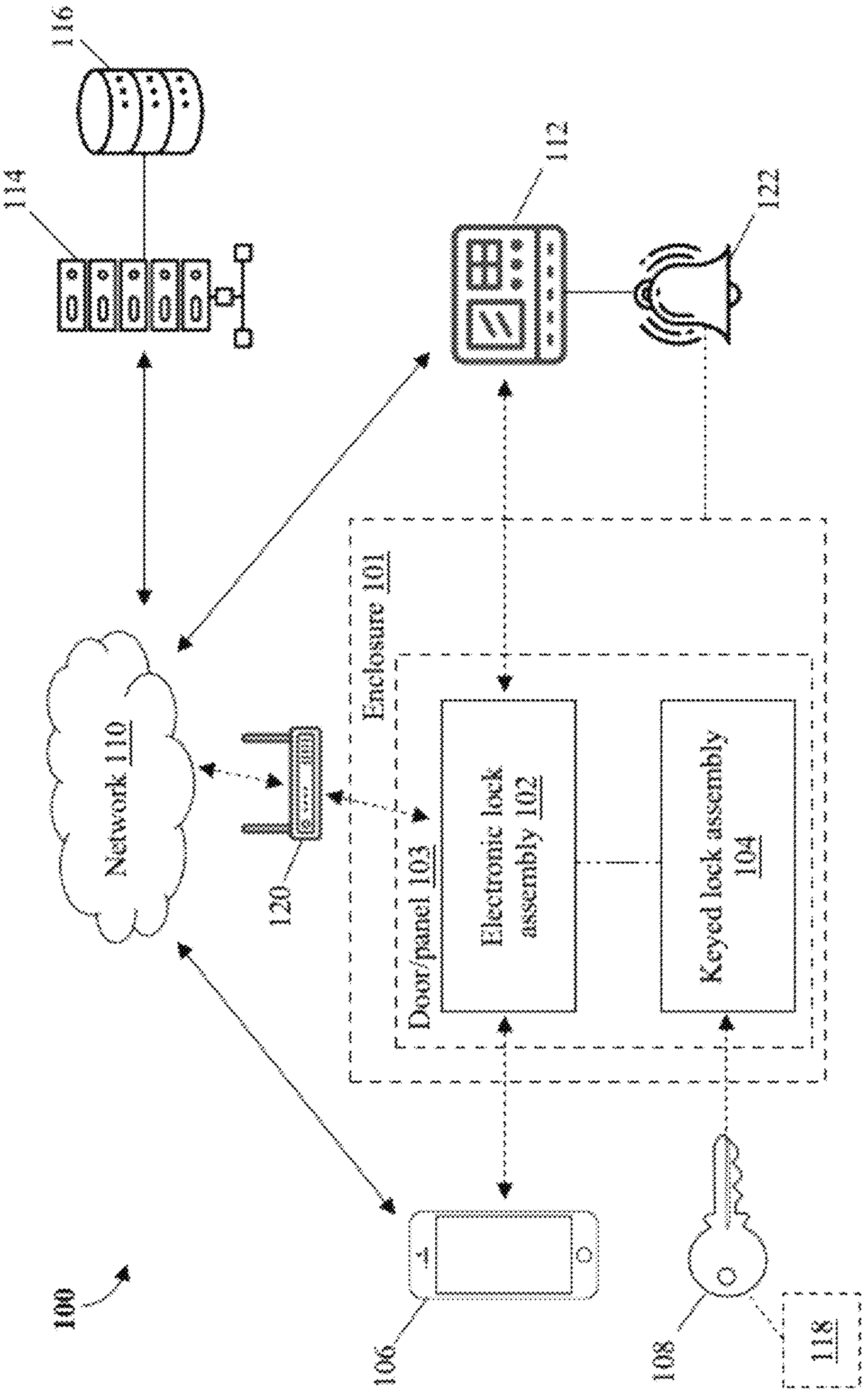
FIG. 1 is an architecture diagram of an electronic locking system with mechanical override, in accordance with certain aspects of the present disclosure.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Descriptions of well-known starting materials, processing techniques, components and equipment are omitted so as not to unnecessarily obscure the invention in detail. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout. All definitions, as defined and used herein, should be understood to control over dictionary definitions, definitions in documents incorporated by reference, and/or ordinary meanings of the defined terms.

Following below are more detailed descriptions of various concepts related to, and embodiments of, inventive methods, devices and systems comprising an electronic access control system and a keyed lock assembly configured to mechanically override at least one locking component of the electronic access control system; and an electronic access control system comprising a keyless storage apparatus configured to securely store one or more physical assets. In certain embodiments, the keyless storage apparatus may be communicably engaged with at least one alarm system controller and/or remote server. Certain aspects of the present disclosure provide for an electromechanical locking system with a fail-safe mechanical override locking system for cabinets, shelter doors, desk and cabinet drawers, locker doors, access panels and doors, mailboxes, dispensers and other secure situations. In certain embodiments detailed herein, the system may utilize an input device, such as a smartphone or tablet computer, to send an access signal to the electromechanical locking system to unlock a door or access panel. In certain embodiments, an electromechanical lockset includes a key cylinder and a deadbolt (e.g., a high security UL 437 listed ANSI Grade 1 steel key and cylinder). The fail-safe key override may be operably configured to ensure access to a secured location in unstable power situations.

Certain embodiments of the present invention comprise electronic and/or mechanical locking devices that are compliant with industry standards and ratings that provide high security protection and safety of use, ADA compliance, FEMA 320 safe room lock design standards, UL 3-hour fire rating, ANSI/BHMA Specifications A156.115, A156.115-W and A156.2, ANSI A117.1 Accessibility Code, hurricane and tornado rated, certified ISO 9001 quality. A variety of shelter configurations may be secured via one or more devices of the present disclosure, including standard, non-standard or in-building doors as well as one-to-many doors that are outward or inward swinging.

Embodiments of the present disclosure may be operably installed in many different types of shelters, electronic equipment cabinets, and storage units, and can be installed several ways within such structures. Certain embodiments of the present disclosure are configured to secure existing mechanical multipoint latches with an integrated blocking solution and positive lock feedback, while interfacing with industry standard commercial off-the-shelf cabinet compression and multipoint electromechanical locks. Support is included in the present disclosure for micro, macro and miscellaneous cabinets, battery, power and networking cabinets, underground CEV's, generators, keylock box vaults and other non-standard cell site enclosures.

It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes. The present disclosure should in no way be limited to the exemplary implementation and techniques illustrated in the drawings and described below.

Where a range of values is provided, it is understood that each intervening value, to the tenth of the unit of the lower limit unless the context clearly dictates otherwise, between the upper and lower limit of that range and any other stated or intervening value in that stated range is encompassed by the invention. The upper and lower limits of these smaller ranges may independently be included in the smaller ranges, and are also encompassed by the invention, subject to any specifically excluded limit in a stated range. Where a stated range includes one or both of the endpoint limits, ranges excluding either or both of those included endpoints are also included in the scope of the invention.

As used herein, "exemplary" means serving as an example or illustration and does not necessarily denote ideal or best.

As used herein, the term "includes" means includes but is not limited to, the term "including" means including but not limited to. The term "based on" means based at least in part on.

As used herein, the term "interface" refers to any shared boundary across which two or more separate components of a computer system may exchange information. The exchange can be between software, computer hardware, peripheral devices, humans, and combinations thereof. The term "interface" may be further defined as any shared boundary or connection between two dissimilar objects, devices or systems through which information or power is passed and/or a mechanical, functional and/or operational relationship is established and/or accomplished. Such shared boundary or connection may be physical, electrical, logical and/or combinations thereof.

As used herein, the term "packet" refers to any formatted unit of data that may be sent and/or received by an electronic device.

As used herein, the term "payload" refers to any part of transmitted data that constitutes an intended message and/or identifying information.

As used herein, the term "access control system" or "electronic access control system" refers to any system for restricting entrance to a property, a building, an area, a container, and/or a room to authorized persons through the use of at least one electronic access control device.

As used herein, the term "electronic access control device" or "access control device" refers to any electronic device that may be a component of an access control system, including: an access control panel (also known as a controller); an access-controlled entry, such as a door, turnstile, parking gate, elevator, or other physical barrier; a reader installed near the entry/exit of an access-controlled area; locking hardware, such as electric door strikes, electromagnetic locks, and electronically-actuated mechanical locks; a magnetic door switch for monitoring door position; and request-to-exit (REX) devices for allowing egress.

As used herein, the term "advertising" or "advertisement" refers to any transmitted packet configured to establish a data transfer interface between two electronic devices. An "advertising" or "advertisement" may include, but is not limited to, a BLE advertising packet transmitted by a peripheral device over at least one BLUETOOTH advertisement channel.

As used herein, the term "flange" means any protruding, projecting, elongated, detent and/or other mechanical structure or component configured to establish a mechanical interface with another mechanical structure or component.

As used herein, the term "signal" refers to any electromagnetic or electrical current that carries data from one electrical component of a system or apparatus to another or from one system or network to another.

As used herein, the term "command signal" refers to any signal that carries data configured to command, actuate, instantiate and/or instruct one or more action or operation by one or more electrical component of a system or apparatus.

Certain benefits and advantages of the present disclosure provide for a compact electronic access control locking system that includes the ability to manually override an electronic lock assembly via a mechanical, keyed lock assembly.

Certain benefits and advantages of the present disclosure provide for a compact and flexible locking system that can be installed in many different types of cabinets and in several ways within a cabinet that secures existing mechanical multipoint latches with an integrated blocking solution and positive lock feedback while interfacing with industry standard off-the-shelf cabinet compression and multi-point electromechanical locks.

Certain benefits and advantages of the present disclosure provide for a flexible locking system capable of supporting micro/macro cabinets, battery, power and networking cabinets, underground CEV's, generators, key lock box vaults and other non-standard cell site enclosures.

Certain benefits and advantages of the present disclosure provide for an electronic access control locking system that enables a technician to access a cell site via electronic access as well as ensure fail-safe access by providing a mechanical key override to unlock a door to the cell site.

Certain exemplary embodiments of the present disclosure provide for a keyless storage apparatus engineered to resist intrusion attempts that occur at remote, unattended locations and/or unoccupied locations after business hours. In accordance with certain aspects of the present disclosure, the keyless storage apparatus can be quickly secured onto a building, cabinet or other structure.

Certain benefits and advantages of the present disclosure include a keyless storage apparatus configured to communicate with one or more mobile electronic device to receive and process a wireless access control request from one or more users of an electronic access control system, such as public safety personnel or field technicians. In accordance with certain aspects of the present disclosure, the mobile electronic device comprises a smartphone application configured to provide on-demand access to the keyless storage apparatus by authorized personnel, while protecting assets against unauthorized intrusions in remote areas and providing an audit trail.

Certain benefits and advantages of the present disclosure include a keyless storage apparatus with military-grade encryption and high-strength steel construction.

Certain benefits and advantages of the present disclosure include a keyless storage apparatus with intrusion-resistant internal attributes and long-lasting battery and cycle count.

Certain benefits and advantages of the present disclosure include a keyless storage apparatus with simple wall or door mounting and a large internal capacity.

Certain benefits and advantages of the present disclosure include a keyless storage apparatus and system with military-grade encryption and credential return detection for items stored in and taken out of the keyless storage apparatus.

Certain benefits and advantages of the present disclosure include a keyless storage apparatus and system configured to enable automated logging and auditing of items returned to the keyless high security vault with associated user credential tracking.

Certain benefits and advantages of the present disclosure include a keyless storage apparatus and system with improved resistance/resilience against intrusion attempts, including one or more anti-tamper sensor(s).

Certain benefits and advantages of the present disclosure include a keyless storage apparatus and system configured to establish a wireless data transfer interface with one or more mobile electronic devices and a backend remote server. The keyless storage apparatus and system may comprise one or more communications protocols to provide for synchronization between the keyless storage apparatus and the backend remote server.

Certain benefits and advantages of the present disclosure include a keyless storage apparatus and system configured to enable compliance with one or more audit trail regulatory requirements.

Turning now descriptively to the drawings, in which similar reference characters denote similar elements throughout the several views, FIG. 1 depicts an architecture diagram of an electronic locking system 100 with mechanical override. In accordance with certain aspects of the present disclosure, system 100 comprises an electronic lock assembly 102 and a keyed lock assembly 104 being operably installed in a door or access panel 103 of a secured enclosure 101. Door or access panel 103 and secured enclosure 101 may comprise a variety of secured locations and structures in which access may be selectively restricted, including but not limited to, cabinets, shelter doors, desk and cabinet drawers, locker doors, access panels and doors, mailboxes, dispensers and other access-controlled structures or environments. In accordance with certain aspects of the present disclosure, electronic lock assembly 102 comprises at least one locking mechanism configured to selectively secure door or access panel 103 to selectively restrict/grant entry to secured enclosure 101. System 100 may further comprise an electronic device 106 communicably engaged with electronic lock assembly 102 in order to pass electronic access credentials thereto. Electronic device 106 may comprise a mobile electronic device, such as a smart phone, tablet computer, personal digital assistant, and the like. Electronic device 106 may alternatively comprise a key card, a pin pad, a radio-frequency identification (RFID) tag, or other electronic input device or identification modality. In accordance with certain embodiments, electronic device 106 is communicably engaged with electronic lock assembly 102 via a wireless communications interface; for example, BLUETOOTH, BLUETOOTH low energy (BLE), RFID, near-field communication (NFC), long range (LoRa) radio communication, WiFi, cellular, and the like. System 100 may further comprise an electronic access control (EAC) server 114 communicably engaged with a EAC database 116. EAC server 114 and EAC database 116 may be communicably engaged with electronic device 106 and/or electronic lock assembly 102 via communications network 110 in order to provision one or more EAC settings or parameters and/or enable one or more EAC commands or operations. In certain embodiments, electronic lock assembly 102 may be communicably engaged with at least one gateway device 120 (e.g., a WiFi router) to facilitate one or more communications between EAC server 114 and electronic lock assembly 102 via communications network 110. In certain embodiments, system 100 may further comprise at least one alarm system comprising an alarm controller 112 operably engaged with at least one alarm 122, wherein alarm controller 112 and alarm 122 are operably configured to provide at least one security alarm function for secured enclosure 101. In certain embodiments, alarm controller 112 may be communicably engaged with one or more components of system 100 via communications network 110. In certain embodiments, electronic lock assembly 102 may be communicably engaged with alarm controller 112 via a wireless or wireline communications interface.

In accordance with certain aspects of the present disclosure, system 100 is operably configured to enable a user of system 100 (e.g., a technician, public safety person, building manager, etc.) to mechanically override a locking component of electronic lock assembly 102 via keyed lock assembly 104 in order to unlock door or access panel 103 and gain access to secured enclosure 101. System 100 may enable the user of system 100 to override electronic lock assembly 102 within the context of various use cases, such as incident to a system failure or power failure where electronic lock assembly 102 is deemed inoperable; access by emergency or public safety personnel; temporary access by an authorized party who has not been given electronic access credentials; and other similar use cases where electronic access controls are unavailable or inoperable. System 100 comprises a mechanical key 108 configured to interface with keyed lock assembly 104 in order to actuate one or more components of keyed lock assembly 104 to drive an interface between the one or more components of keyed lock assembly 104 and one or more components of electronic lock assembly 102. In accordance with certain aspects of the present disclosure, the one or more components of keyed lock assembly 104, when actuated by mechanical key 108, are configured to move, displace and/or otherwise apply mechanical force to the one or more components of electronic lock assembly 102 in order to unlock or disengage at least one locking component of electronic lock assembly 102 to unlock door or access panel 103 and grant access to secured enclosure 101.

In accordance with certain aspects of the present disclosure, electronic lock assembly 102 may comprise one or more switch or sensor configured to sense that electronic lock assembly 102 has been overridden by keyed lock assembly 104 and provide an override signal to a controller of electronic lock assembly 102. Electronic lock assembly 102 may be configured to communicate the override signal to one or more devices in system 100 (e.g., via communications network 110). In certain embodiments, electronic lock assembly 102 may be configured to store data associated with the override signal in memory in order to create an audit log of the override event. In accordance with certain embodiments, electronic lock assembly 102 may be configured to communicate the override signal to alarm controller 112. Alarm controller 112 may be configured to process the override signal (e.g., according to one or more alarm system protocols) to override (i.e., suppress) alarm 122 for secured enclosure 101. In certain embodiments, mechanical key 108 may comprise an integrated or connected RFID tag 118. Electronic lock assembly 102 may comprise an RFID reader configured to receive a signal from RFID tag 118 comprising identification data for mechanical key 108. Electronic lock assembly 102 may be configured to store the identification data in memory and/or communicate a signal comprising the identification data to one or more devices in system 100 via communications network 110. In accordance with certain embodiments, electronic lock assembly 102 may be configured to communicate the identification data to alarm controller 112. Alarm controller 112 may be configured to process the identification data (e.g., according to one or more alarm system protocols) to override (i.e., suppress) alarm 122 for secured enclosure 101.

Figure 2B:
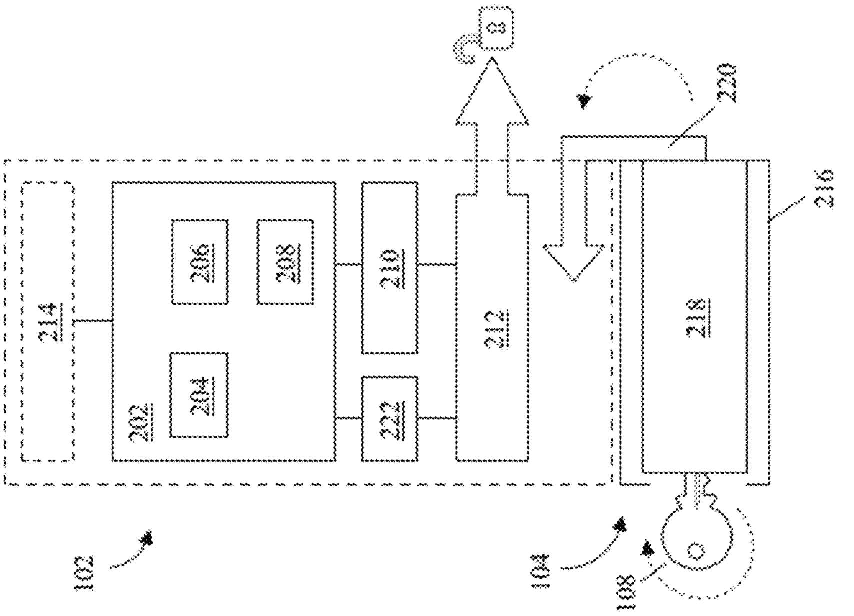
FIGS. 2A-2B are functional block diagrams of an electronic locking system with mechanical override, in accordance with certain aspects of the present disclosure.
Figure 2A:
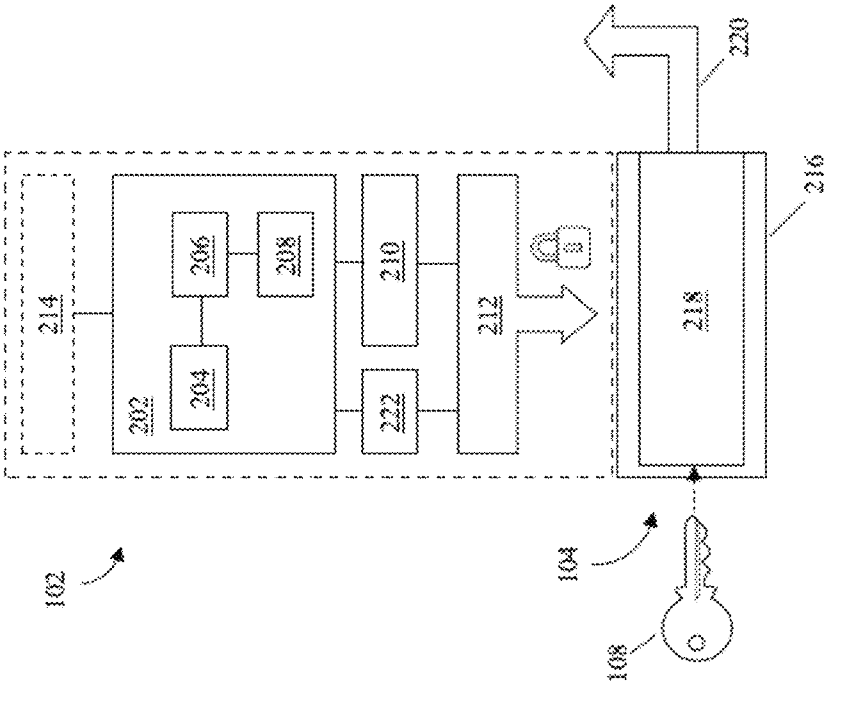

Referring now to FIGS. 2A-2B, functional block diagrams of electronic lock assembly 102 and keyed lock assembly 104 are shown. In accordance with certain aspects of the present disclosure, FIGS. 2A-2B provide a schematic illustration of the components of electronic lock assembly 102 and keyed lock assembly 104 and their functional relationship. In accordance with certain embodiments, electronic lock assembly 102 comprises a controller 202, a power supply 214, an electronic actuator 210 and a locking mechanism 212. Controller 202 may comprise a processor 204, a memory device 206, and a communications module 208. Communications module 208 may comprise a wireless communications module and may include a BLUETOOTH chipset and/or a WiFi chipset. Power supply 214 may be operably engaged with controller 202 and/or electronic actuator 210 to supply a flow of electricity thereto. Electronic actuator 210 may comprise one or more devices configured to drive locking mechanism 212, such as a solenoid or an electronic motor engaged with at least one gear and driveline. Locking mechanism 212 may comprise one or more mechanical structure configured to engage a locking interface with another mechanical structure; for example, a pin, a latch, a deadbolt, a blocking mechanism and the like. Examples of such structures are well-known in the art and will not be discussed at length here so as to not unnecessarily obscure the disclosure. In accordance with certain aspects of the present disclosure, electronic actuator 210 is configured to drive/actuate locking mechanism between a locked position and an unlocked position in response to a command from controller 202. In certain embodiments, electronic lock assembly 102 may comprise an RFID reader 222 communicably engaged with controller 202. RFID reader 222 may comprise a radio frequency antenna configured to pulse an interrogation signal comprising at least one radio frequency and receive a signal back from one or more radio frequency devices (e.g., RFID tag 118 as shown in FIG. 1). In certain embodiments, the radio frequency may comprise a frequency in a low frequency range (e.g., 125 kHz-134 kHz), a high frequency range (e.g., 13.56 MHZ) and/or an ultra-high frequency range (e.g., 856 MHz-960 MHz). In accordance with certain aspects of the present disclosure, keyed lock assembly 104 may comprise a lock cylinder 216, a lock driver 218, and a flange 220. Lock cylinder 216 may be installed in an aperture of a door or access panel of an enclosure (e.g., door or access panel 103 of secured enclosure 101 of FIG. 1) such that a proximal end of lock cylinder 216 is disposed on an exterior surface of a door or access panel of an enclosure and a distal end of lock cylinder 216 extends into an interior area of the enclosure. Lock driver 218 may be coupled to lock cylinder 216 such that lock driver 218 may be operably rotated within lock cylinder 216. Lock driver 218 may be keyed to mechanical key 108. Flange 220 may be coupled to a distal end of lock driver 218. Flange 220 and the distal end of lock driver 218 may be located in the interior area of the enclosure. Flange 220 may comprise one or more protruding, projecting, elongated, detent and/or other mechanical structure or component configured to establish a mechanical interface with another mechanical structure or component. In accordance with certain aspects of the present disclosure, lock driver 218 is configured to rotate flange 220 around an axis of lock driver 218, when lock driver 218 is rotated by mechanical key 108.

In accordance with certain aspects of the present disclosure, FIG. 2A depicts electronic lock assembly 102 with locking mechanism 212 engaged in a locked position and keyed lock assembly 104 configured in a disengaged position; and FIG. 2B depicts electronic lock assembly 102 with locking mechanism 212 engaged in an unlocked/override position and keyed lock assembly 104 configured in an engaged position. In accordance with certain aspects of the present disclosure, a user of the electronic access control system may initiate a mechanical override of electronic lock assembly 102 by inserting mechanical key 108 into lock driver 218. The user then turns mechanical key 108 to rotate lock driver 218 in a first direction, thereby rotating flange 220 in the first direction. Upon rotating flange 220 in the first direction, electronic lock assembly 102 and keyed lock assembly 104 are configured wherein flange 220 is configured to establish a mechanical interface with at least one surface or structure of electronic lock assembly 102 to apply force to locking mechanism 212 in order to move, disengage or displace locking mechanism 212 from the locked position to the unlocked position. Upon forcing locking mechanism 212 from the locked position to the unlocked position via flange 220, the mechanical override of electronic lock assembly 102 is complete and the user may access the door or access panel of the enclosure.

Figure 3:
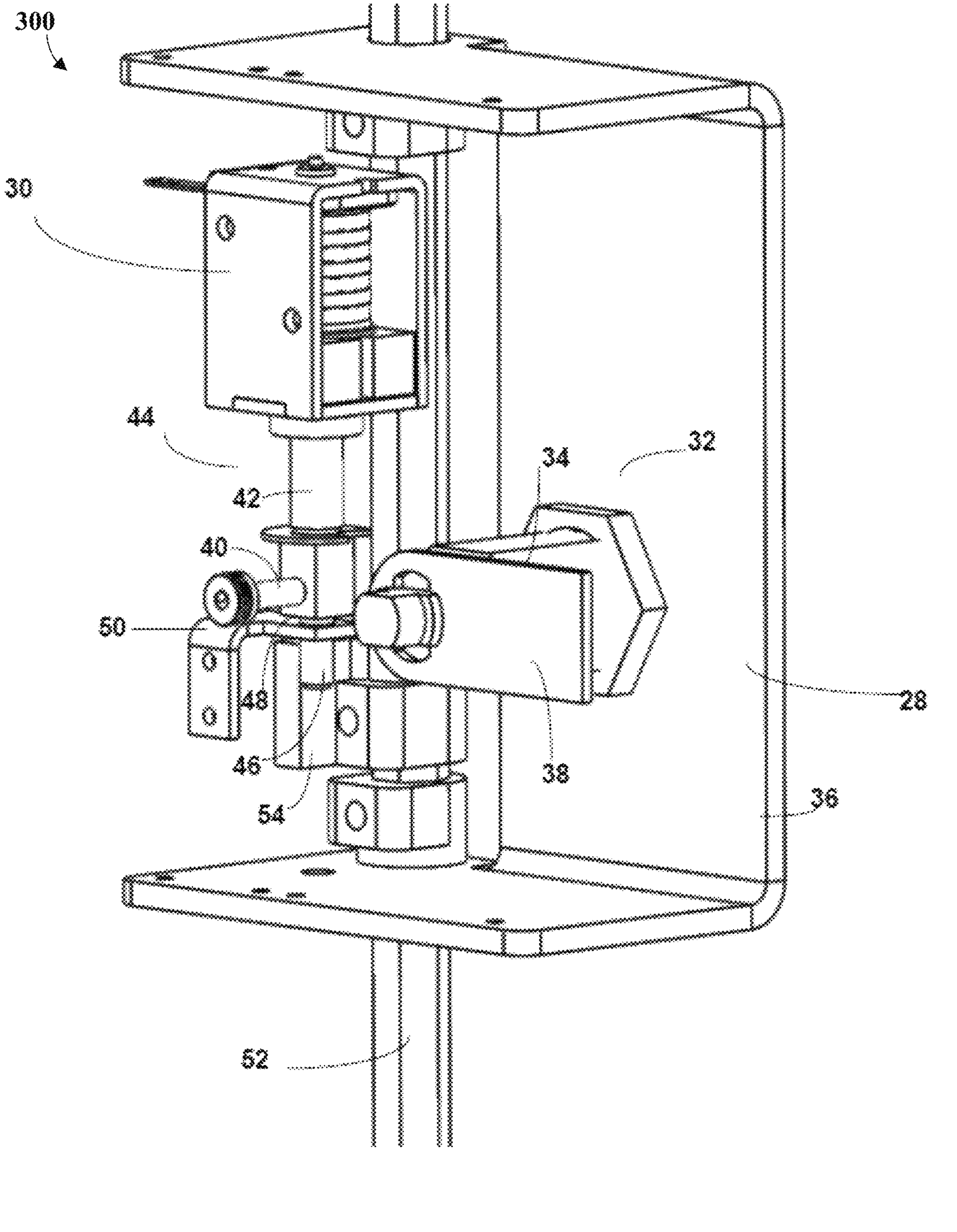
FIG. 3 is a component view of an electronic locking apparatus and system with mechanical override, in accordance with certain aspects of the present disclosure.

Referring now to FIGS. 3-6, component views of an electronic locking apparatus and system 300 with mechanical override are shown. In accordance with certain aspects of the present disclosure, apparatus and system 300 may comprise an embodiment of electronic lock assembly 102 and keyed lock assembly 104 with system 100, as shown in FIGS. 1 and 2. In accordance with certain embodiments, apparatus and system 300 includes a compact hardened anti-drill steel housing 28 containing a set of electronic components 30 and a mechanical override locking assembly 32 comprising a cam lock assembly having a cam lock cylinder unit 34 extending from a back side 36 of the housing 28 with a lock driver in the cylinder unit and a cam flange 38 attached thereto and extending perpendicular therefrom. In certain embodiments, cam flange 38 may be configured to rotate in a direction parallel to the surface of housing back side 36. Upon insertion of a mechanical key (e.g., mechanical key 108 of FIG. 1) into lock driver in cam lock cylinder unit 34, rotation of the mechanical key rotates the cam flange 38 in either a clockwise or counterclockwise direction. As illustrated in FIG. 3, when cam flange 38 is rotated in a counterclockwise direction (i.e., a first direction), it is configured to intercept a pin 40 attached to a longitudinal shaft 42 of a magnetically latching solenoid 44. Pin 40 may be oriented perpendicular to shaft 42.

In accordance with certain embodiments, magnetically latching solenoid 44 further includes a retractable plunger 46 seated within the body of solenoid 44. Plunger 46 extends through an aperture 48 in a plate 50 that blocks movement of a shaft 52 by blocking movement of block plate 54 attached thereto. In operation, firing solenoid 44 pushes retractable plunger 46 through aperture 48 thereby blocking movement of block plate 54 on shaft 52. Solenoid 44 also can retract plunger 46 into the body of solenoid 44 thereby unblocking movement of shaft 52. Alternatively, in the preferred embodiment of the current invention, when apparatus and system 300 is configured in a locked position, plunger 46 can be moved to an unblocked position by the mechanical override provided by manual override locking assembly 32.

Figure 4:
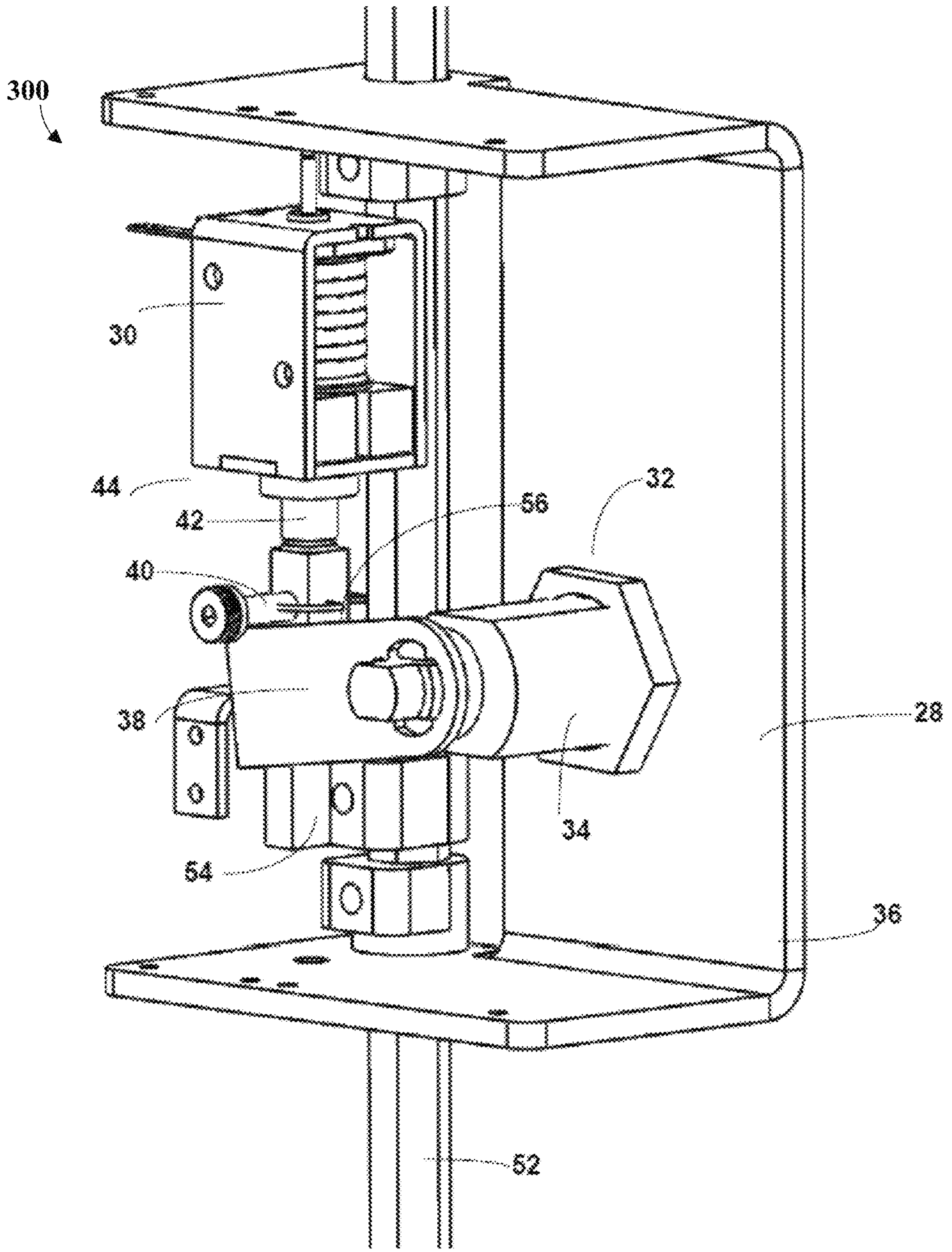
FIG. 4 is a component view of an electronic locking apparatus and system with mechanical override, in accordance with certain aspects of the present disclosure.

In accordance with certain embodiments, as illustrated in FIG. 4, when the key is inserted into the cam lock cylinder unit 34 and rotated, a side edge 56 of cam flange 38 abuts pin 40 and moves retractable plunger 46 (shown in FIG. 3) out of aperture 48 (shown in FIG. 3), which allows block plate 54 on shaft 52 to rotate freely. Alternatively, plunger 46 can be moved to a blocking position by the mechanical override provided by manual override locking assembly 32. When the key is inserted into the cam lock cylinder unit 34 and rotated, cam flange 38 can abut pin 40 to move retractable plunger 46 into aperture 48 to stop block plate 54 from rotating on shaft 52.

In certain embodiments, rotation of cam lock cylinder unit 34 directs a side edge 56 of cam flange 38 to move solenoid 44 on a track into an unblocked position to allow block plate 54 on shaft 52 to rotate freely. When the mechanical key is rotated and the key is removed, the cam flange 38 physically retains the sliding solenoid in a downward position. Additionally, retractable plunger 46 can be moved into a retracted position when cam flange 38 applies pressure to a different component other than pin 40, thereby pushing plunger 46 into solenoid 44 resulting in configuring an unblocked position. In accordance with certain embodiments, plunger 46 is latched and magnetically held in position within solenoid 44 after cam flange 38 pushes plunger 46 out of aperture 48. The lock driver unit in cam lock cylinder unit 34 may be key retaining so that the key cannot be removed from the lock unless the lock has been returned to a locked state. In accordance with certain embodiments, apparatus and system 300 further includes a position sensor configured to generate position feedback to sense whether apparatus and system 300 is configured in a locked configuration or unlocked configuration. In certain embodiments, one or more Hall effect sensors are mounted within apparatus and system 300 and activated based on the position of plunger 46. Various alternative mechanical or electronic position sensors or switches may be used in apparatus and system 300 to sense the locked or unlocked configuration of system 300 based on other system components, including but not limited to, one or more accelerometer, capacitive displacement sensor, Eddy-current sensor, Hall effect sensor, inductive sensor, Laser Doppler vibrometer, linear variable differential transformer, piezo-electric transducer, one or more position encoder, potentiometer, proximity sensor (optical), string potentiometer, and/or ultrasonic sensor.

Figure 5:
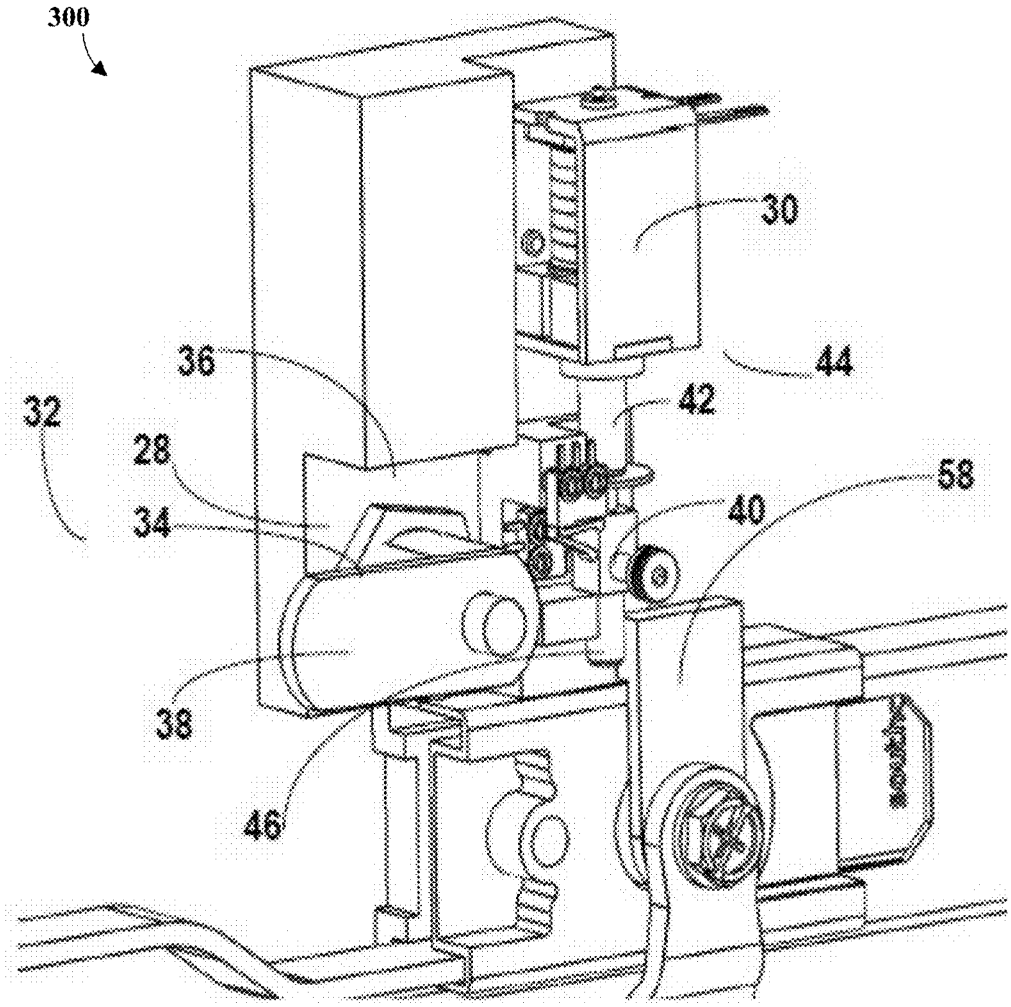
FIG. 5 is a component view of an electronic locking apparatus and system with mechanical override, in accordance with certain aspects of the present disclosure.
Figure 6:
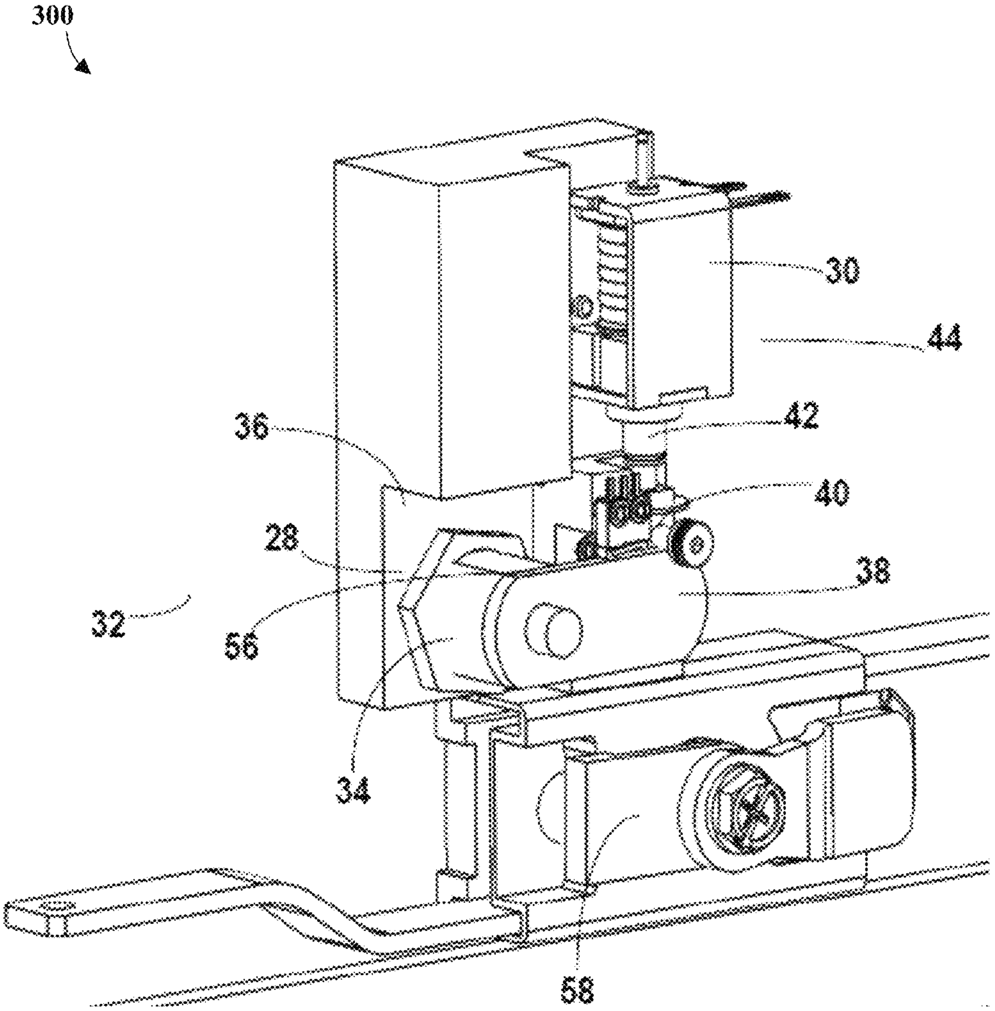
FIG. 6 is a component view of an electronic locking apparatus and system with mechanical override, in accordance with certain aspects of the present disclosure.

Referring now to FIG. 5, in accordance with certain embodiments, apparatus and system 300 is shown in a blocked/locked configuration wherein plunger 46 is extended to prevent/restrict movement of a block plate 58. In accordance with said embodiments, apparatus and system 300 may be configured in an unlocked configuration in response to plunger 46 being retracted into the unblocked position with the mechanical override locking assembly 32. As illustrated in FIG. 6, when the key is inserted into the cam lock cylinder unit 34 and rotated, a side edge 56 of cam flange 38 abuts pin 40 and moves retractable plunger 46 (shown in FIG. 5) out of the way of block plate 58, thereby allowing movement past block plate 58. Cam flange 38 moves plunger 46 into magnetically latching solenoid 44 wherein plunger 46 latches into an unblocked position.

Figure 7:
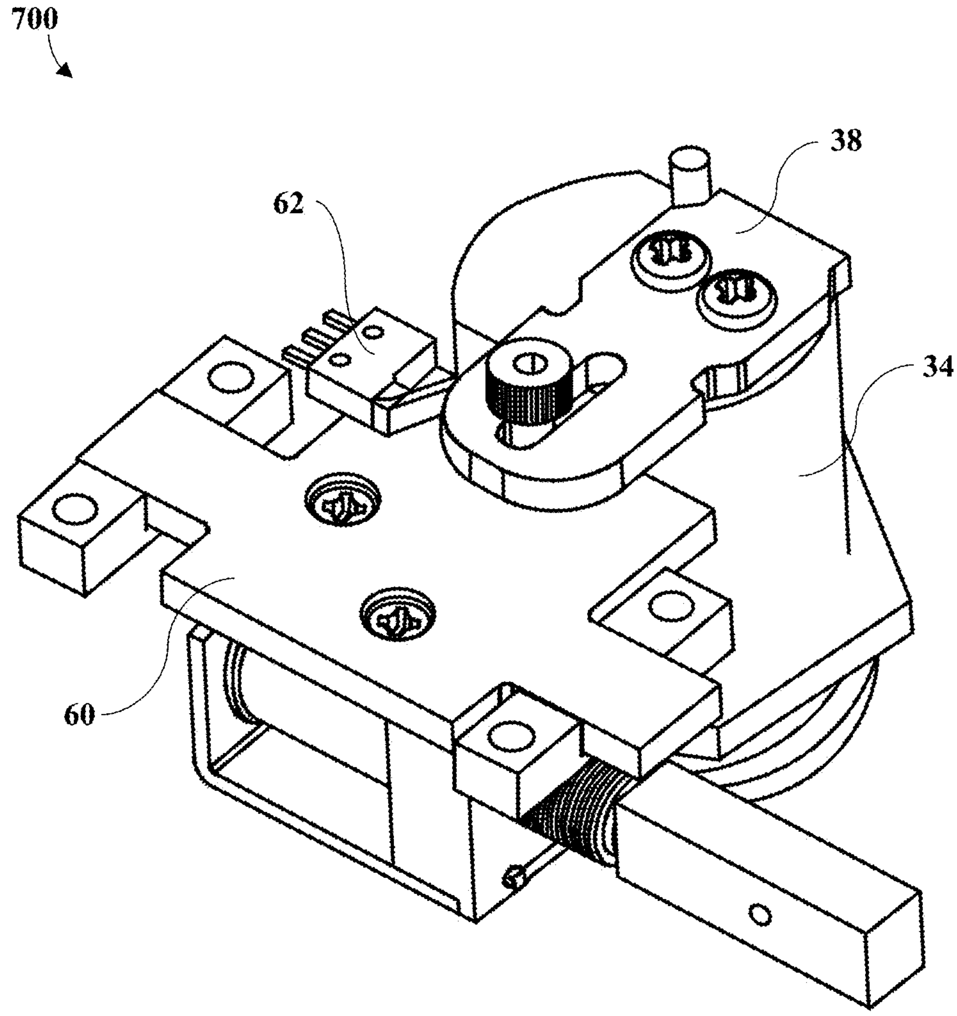
FIG. 7 is a component view of an electronic locking apparatus and system with mechanical override, in accordance with certain aspects of the present disclosure.
Figure 8:
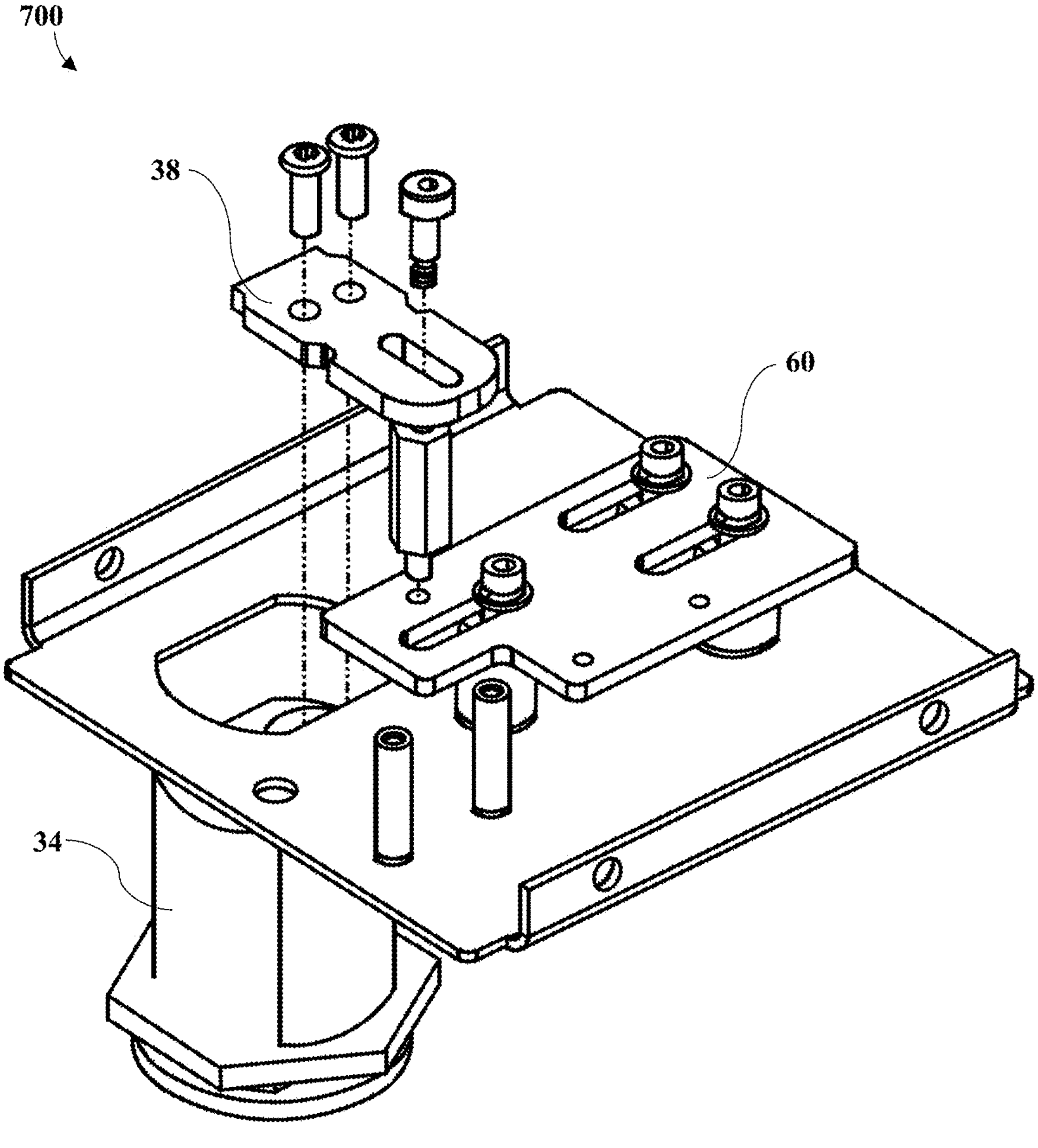
FIG. 8 is a component view of an electronic locking apparatus and system with mechanical override, in accordance with certain aspects of the present disclosure.

FIGS. 7-8 illustrate a component view of an electronic locking apparatus and system 700 with mechanical override.

Apparatus and system 700 may comprise an alternative embodiment to apparatus and system 300, as shown in FIGS. 5-6. Apparatus and system 700 may comprise an embodiment of electronic lock assembly 102 and keyed lock assembly 104 with system 100, as shown in FIGS. 1 and 2. In accordance with certain aspects of the present disclosure, apparatus and system 700 may be configured such that an entire solenoid assembly may slide on a sliding blocker mechanism 60. Apparatus and system 700 may comprise a switch 62 configured to indicate when the key has been used. Upon rotating the key in a first direction, flange 38 is configured to slide sliding blocker mechanism 60 from its starting position such that sliding blocker mechanism 60 is disengaged from a locked position into an unlocked position. Upon rotating the key in a second direction, flange 38 is configured to slide sliding blocker mechanism 60 back to its original position to reengage sliding blocker mechanism 60. In certain embodiments, lock driver 34 is key retaining, such that the key cannot be removed unless sliding blocker mechanism 60 is restored to its original (i.e., locked) position.

Figure 9:
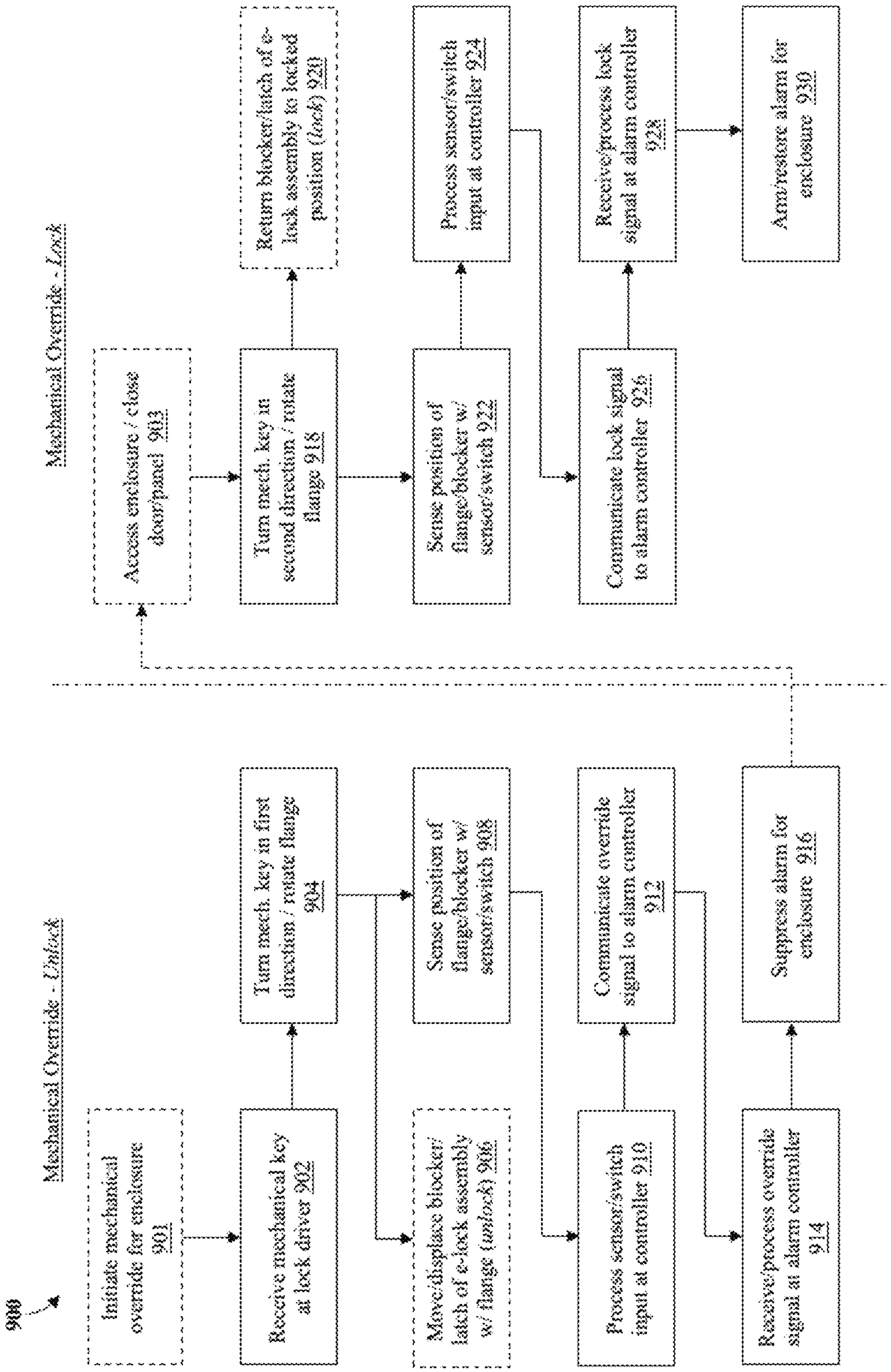
FIG. 9 is a process flow diagram for an electronic locking system and method, in accordance with certain aspects of the present disclosure.

Referring now to FIG. 9, a process flow diagram of an electronic locking system and method 900 is shown. The electronic locking system and method may be embodied within one or more aspects of system 100, as shown and described in FIGS. 1 and 2, and may incorporate electronic locking apparatus and system 300, as shown and described in FIGS. 3-6 and/or electronic locking apparatus and system 700, as shown and described in FIGS. 7-8. In accordance with certain aspects of the present disclosure, method 900 may comprise one or more of steps 902-916 to mechanically override (i.e., unlock) an electronic lock assembly to gain access to a secured enclosure and one or more of steps 918-930 to mechanically lock the electronic lock assembly when access to the secured enclosure is complete.

In accordance with certain aspects of the present disclosure, method 900 may be initiated in order to mechanically override an electronic locking system comprising an electronic lock assembly operably installed at a door or access panel of a secured enclosure (Step 901). Method 900 may begin upon receiving a mechanical key at a lock driver of a mechanical lock assembly (Step 902). A user may proceed by turning the key in a first direction, thereby rotating a flange or other mechanical structure coupled to a distal end of the lock driver in the first direction (Step 904). In accordance with certain aspects of the present disclosure, the flange may be configured to move or displace a blocker or latching mechanism of the electronic lock assembly to configure the electronic lock assembly from a locked state to an unlocked state (Step 906). Method 900 may continue by performing one or more steps or operations for sensing or determining the position of the flange and/or the blocker or latching mechanism via at least one sensor or switch (Step 908). Method 900 may continue by performing one or more steps or operations for processing an input signal from the sensor or switch as an "override" signal at a controller of the electronic locking system (Step 910). In certain embodiments, method 900 may continue by performing one or more steps or operations for communicating (e.g., with the controller of the electronic locking system) the override signal to an alarm system controller (Step 912). In certain embodiments, the alarm system controller is configured to control at least one alarm for the secured enclosure. Method 900 may continue by performing one or more steps or operations for receiving and processing the override signal at the alarm system controller (e.g., according to one or more alarm system protocols) (Step 914). Method 900 may continue by performing one or more steps or operations for suppressing (e.g., via one or more operations of the alarm system controller) the at least one alarm for the secured enclosure (Step 916).

In accordance with certain aspects of the present disclosure, a user may access the enclosure to perform one or more tasks and may close a door or access panel of the enclosure upon completion of said tasks (Step 903). Method 900 may continue by performing one or more of steps 918-930 in order to return the electronic locking system to a locked state. Method 900 may proceed upon the user turning the mechanical key in a second direction (i.e., opposite the first direction) to rotate the flange back to its starting position (Step 918). Concurrently with Step 918, the electronic locking system is configured to reengage the blocker or latching mechanism of the electronic lock assembly back to its original position (i.e., locked state) (Step 920). In accordance with certain embodiments, method 900 may comprise one or more of steps or operations to sense the position of the flange and/or the blocker or latching mechanism via an input signal received at the sensor or switch of the electronic lock assembly. Method 900 may continue by performing one or more steps or operations for processing the input signal from the sensor or switch as a "lock" signal (Step 924) and communicating (e.g., with the controller of the electronic locking system) the lock signal to the alarm system controller (Step 926). Method 900 may continue by performing one or more steps or operations for receiving and processing the lock signal at the alarm system controller (e.g., according to one or more alarm system protocols) (Step 928). Method 900 may continue by performing one or more steps or operations for restoring or arming the at least one alarm for the secured enclosure in response to receiving the lock signal input from the controller of the electronic locking system (Step 930).

Figure 10:
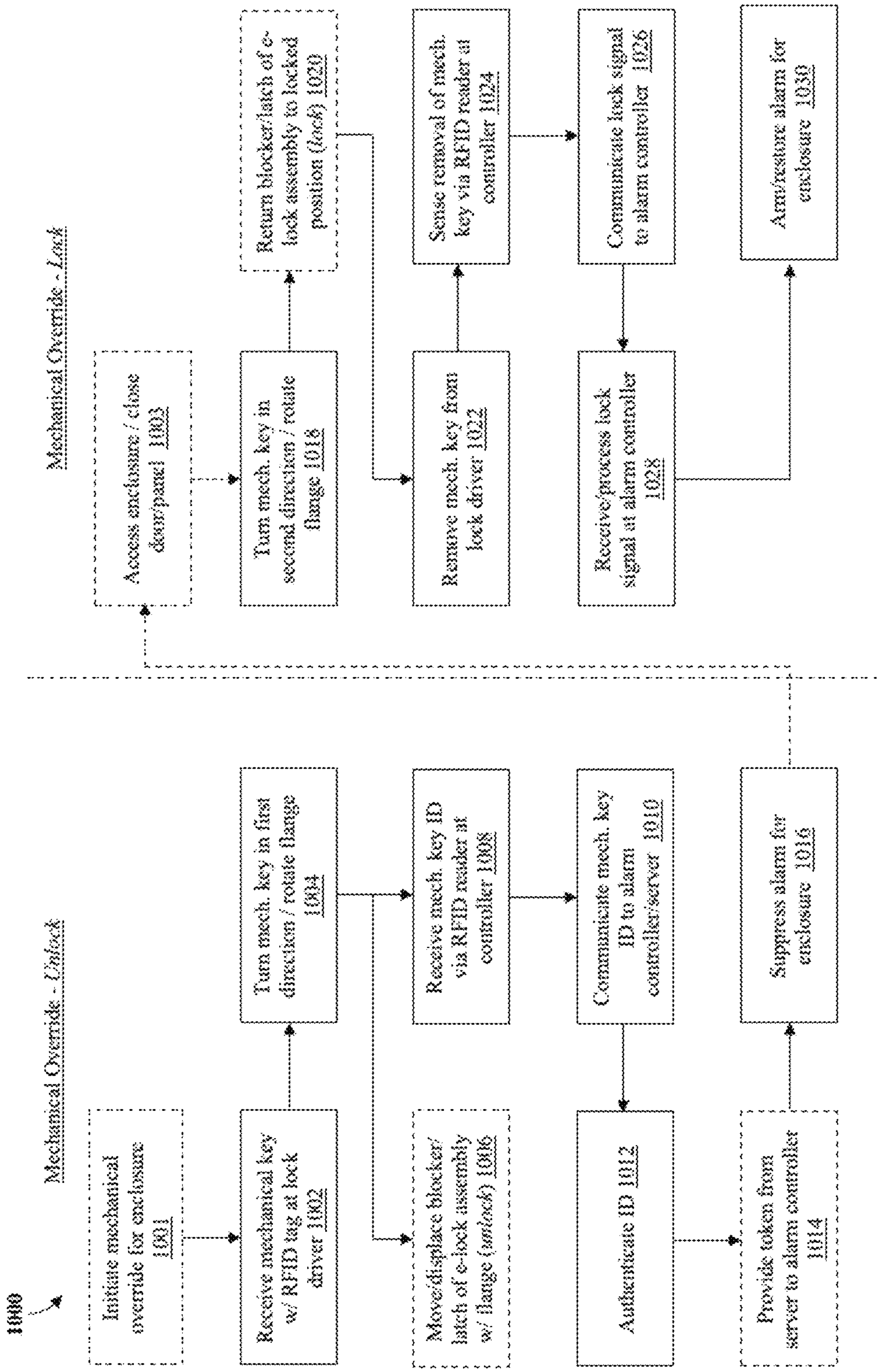
FIG. 10 is a process flow diagram for an electronic locking system and method, in accordance with certain aspects of the present disclosure.

Referring now to FIG. 10, a process flow diagram of an electronic locking system and method 1000 is shown. In accordance with certain aspects of the present disclosure, the electronic locking system and method 1000 may be embodied within one or more aspects of system 100, as shown and described in FIGS. 1 and 2, and may incorporate electronic locking apparatus and system 300, as shown and described in FIGS. 3-6 and/or electronic locking apparatus and system 700, as shown and described in FIGS. 7-8. In accordance with certain aspects of the present disclosure, method 1000 may be performed alternatively or in addition to method 900, as described in FIG. 9. Method 1000 may comprise one or more of steps 1002-1016 to mechanically override (i.e., unlock) an electronic lock assembly of the electronic locking system to gain access to a secured enclosure, and may comprise one or more of steps 1018-1030 to mechanically lock the electronic lock assembly when access to the secured enclosure is complete.

In accordance with certain aspects of the present disclosure, method 1000 may be initiated in order to mechanically override an electronic locking system comprising an electronic lock assembly operably installed at a door or access panel of a secured enclosure (Step 1001). Method 1000 may begin upon receiving a mechanical key with an integrated or attached RFID tag (e.g., RFID tag 118 of FIG. 1) at a lock driver of a mechanical lock assembly (Step 1002). A user may proceed by turning the key in a first direction, thereby rotating a flange or other mechanical structure coupled to a distal end of the lock driver in the first direction (Step 1004). In accordance with certain aspects of the present disclosure, the flange may be configured to move or displace a blocker or latching mechanism of the electronic lock assembly to configure the electronic lock assembly from a locked state to an unlocked state (Step 1006). Method 900 may continue by performing one or more steps or operations for receiving a radio-frequency signal from the RFID tag via an RFID reader communicably engaged with the controller of the electronic locking system and processing the radio-frequency signal to obtain identification data associated with the RFID tag (Step 1008). In certain embodiments, step 1008 may comprise one or more steps or operations for emitting an electromagnetic interrogation pulse with an antenna of the RFID reader to receive the radio-frequency signal from the RFID tag. In certain embodiments, the electromagnetic interrogation pulse may comprise a frequency of 13.56 MHz. Method 1000 may continue by performing one or more steps or operations for communicating (e.g., with the controller of the electronic locking system) the identification data to an alarm system controller and, optionally, to at least one EAC server via a communications network (Step 1010). In certain embodiments, the alarm system controller and/or the EAC server are configured to authenticate the identification data according to one or more authentication parameters (Step 1012). Method 1000 may, optionally, continue by performing one or more steps or operations for providing an authentication token to the alarm controller and/or the controller of the electronic locking system (Step 1014). Method 1000 may continue by performing one or more steps or operations for receiving and processing the identification data, and optionally the authentication token, at the alarm system controller (e.g., according to one or more alarm system protocols) and suppressing (e.g., via one or more operations of the alarm system controller) the at least one alarm for the secured enclosure (Step 1016).

In accordance with certain aspects of the present disclosure, a user may access the enclosure to perform one or more tasks and may close the door or access panel of the enclosure upon completion of said tasks (Step 1003). Method 1000 may continue by performing one or more of steps 1018-1030 in order to return the electronic locking system to a locked state. Method 1000 may proceed upon the user turning the mechanical key in a second direction (i.e., opposite the first direction) to rotate the flange back to its starting position (Step 1018). Concurrently with Step 1018, the electronic locking system is configured to reengage the blocker or latching mechanism of the electronic lock assembly back to its original position (i.e., locked state) (Step 1020). Upon completion of step 1018, the user may remove the mechanical key from the lock driver (Step 1022). Method 1000 may continue by performing one or more steps or operations for sensing removal of the mechanical key via the RFID reader at the controller of the electronic locking system (Step 1024). Step 1024 may comprise one or more steps or operations for determining a position of the mechanical key optionally by failing to receive a return signal from the RFID tag in response to emitting an interrogation pulse with the antenna. Method 1000 may continue by performing one or more steps or operations for processing the RFID input (or lack thereof) as a “lock” signal at the controller and communicating the lock signal to the alarm system controller (Step 1026). Method 1000 may continue by performing one or more steps or operations for receiving and processing the lock signal at the alarm system controller (e.g., according to one or more alarm system protocols) (Step 1028). Method 1000 may continue by performing one or more steps or operations for restoring or arming the at least one alarm for the secured enclosure in response to receiving the lock signal input from the controller of the electronic locking system (Step 1030).

Figure 11:
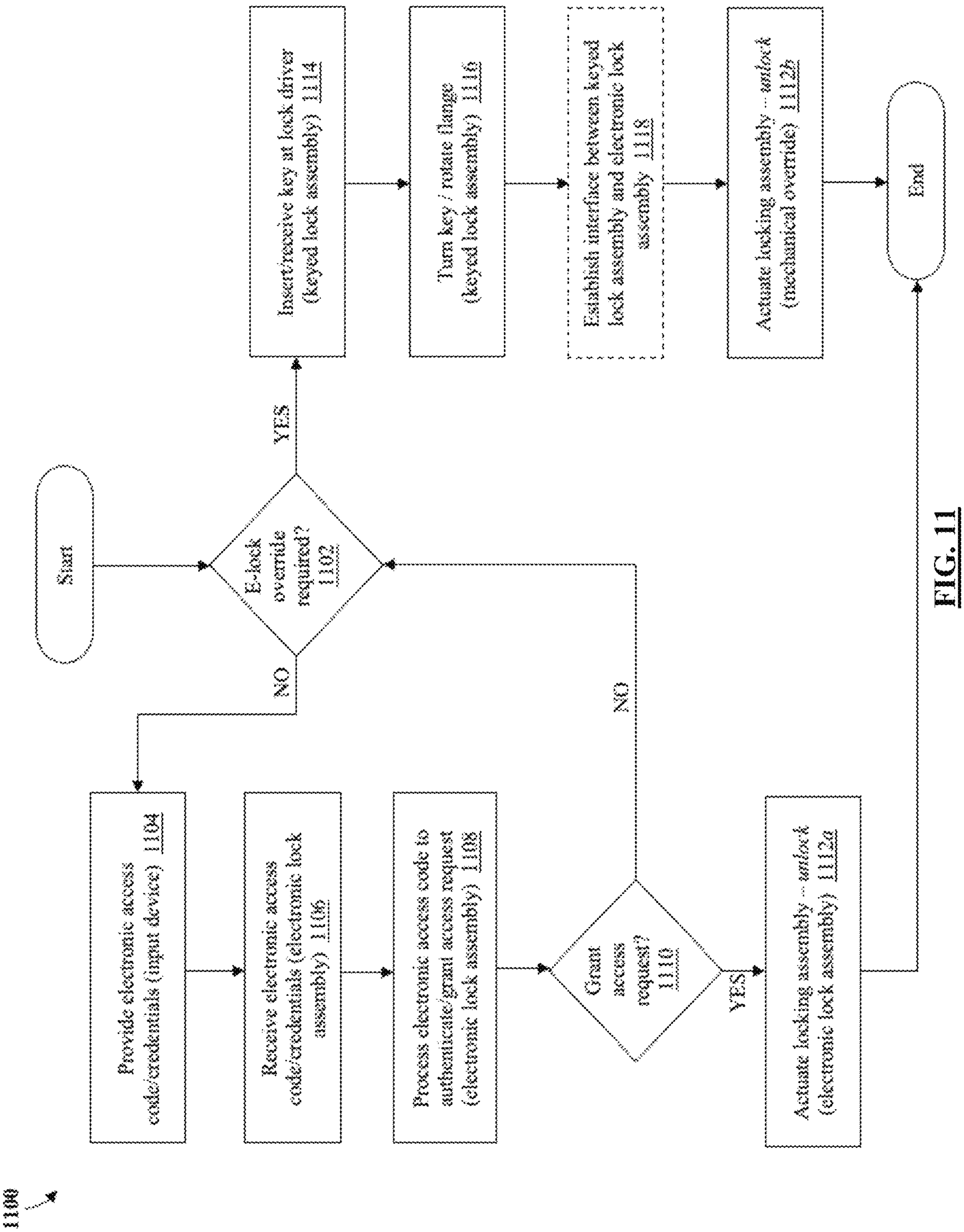
FIG. 11 is a process flow diagram for an electronic locking system and method, in accordance with certain aspects of the present disclosure.

Referring now to FIG. 11, a process flow diagram for an electronic locking system and method 1100 is shown. In accordance with certain aspects of the present disclosure, the electronic locking system and method 1100 may be embodied within one or more aspects of system 100, as shown and described in FIGS. 1 and 2, and may incorporate electronic locking apparatus and system 300, as shown and described in FIGS. 3-6 and/or electronic locking apparatus and system 700, as shown and described in FIGS. 7-8. In accordance with certain aspects of the present disclosure, method 1100 may comprise one or more steps of method 900, as shown and described in FIG. 9, and/or method 1000, as shown and described in FIG. 10.

In accordance with certain aspects of the present disclosure, method 1100 may be initiated in response to decision step 1102 to determine whether a mechanical override of an electronic locking system is required. Example scenarios for which a mechanical override of the electronic locking system may be required are detailed above. If an outcome of decision step 1102 is NO (i.e., an override is not required), method 1100 may proceed by performing one or more steps or operations for providing electronic access credentials and/or an electronic access code from an input device to a controller of an electronic lock assembly via a data transfer interface (Step 1104). The electronic lock assembly may comprise an electronic actuator and a locking mechanism operably engaged with the electronic actuator. The electronic actuator may be configured to actuate the locking mechanism between a locked position and an unlocked position in response to a command signal from the controller. In certain embodiments, the controller comprises a wireless communications module. The electronic access credentials/code are associated with an access request from a user of the electronic locking system to obtain access to a secured access point (e.g., a door, an access panel, etc.) of a secured enclosure. In certain embodiments, step 1104 may comprise one or more steps or operations for establishing a wireless data transfer interface (e.g., BLUETOOTH connection) between the input device (e.g., a smart phone) and the controller of the electronic lock assembly (e.g., via the wireless communications module). Method 1100 may proceed by executing one or more steps or operations for receiving the electronic access credentials/code from the device via the data transfer interface at the controller of an electronic lock assembly (Step 1106). Method 1100 may proceed by executing one or more steps or operations for processing (e.g., with at least one processor of the controller) the electronic access credentials/code to authenticate/authorize the electronic access request to grant access to the access point of the enclosure (Step 1108). Method 1100 may proceed according to decision step 1110 to either grant access or deny access based on whether the electronic access credentials/code are successfully authenticated or failed to be successfully authenticated. If the output of decision step 1110 is YES (i.e., the electronic access credentials/code are successfully authenticated), then method 1100 proceeds by performing one or more operations for commanding (e.g., with the controller) the electronic actuator to actuate the locking mechanism from a locked position to an unlocked position and grant the user access to the access point (Step 1112*a*). If the output of decision step 1110 is NO, then method 1100 proceeds to decision step 1102.

In accordance with certain aspects of the present disclosure, if an output of decision step 1102 is YES (i.e., the user determines that a mechanical override of the electronic locking system is required), then method 1100 proceeds to steps 1114-1112*b*. If the user determines that a mechanical override of the electronic locking system is required, the user may proceed to insert a mechanical key into a lock driver of a keyed lock assembly operably installed at the access point of the secured location (Step 1114). In certain embodiments, the keyed lock assembly comprises a lock cylinder, the lock driver operably coupled to the lock cylinder, and a flange extending from a distal end of the lock driver, wherein upon rotating the lock driver in a first direction, the flange is rotated around an axis of the lock driver from a first position to a second position. The user may proceed by turning the key to rotate the lock driver in the first direction, thereby rotating the flange from the first position to the second position (Step 1116). Concurrently with step 1116, upon rotating the flange to the second position, the flange is configured to establish an interface with at least one surface/structure of the electronic locking assembly (Step 1118) and apply force to the at least one surface/structure of the electronic lock assembly to actuate the locking mechanism from the locked position to the unlocked position (Step 1112*b*); thereby enabling the user to obtain access to the access point.

Figure 12:
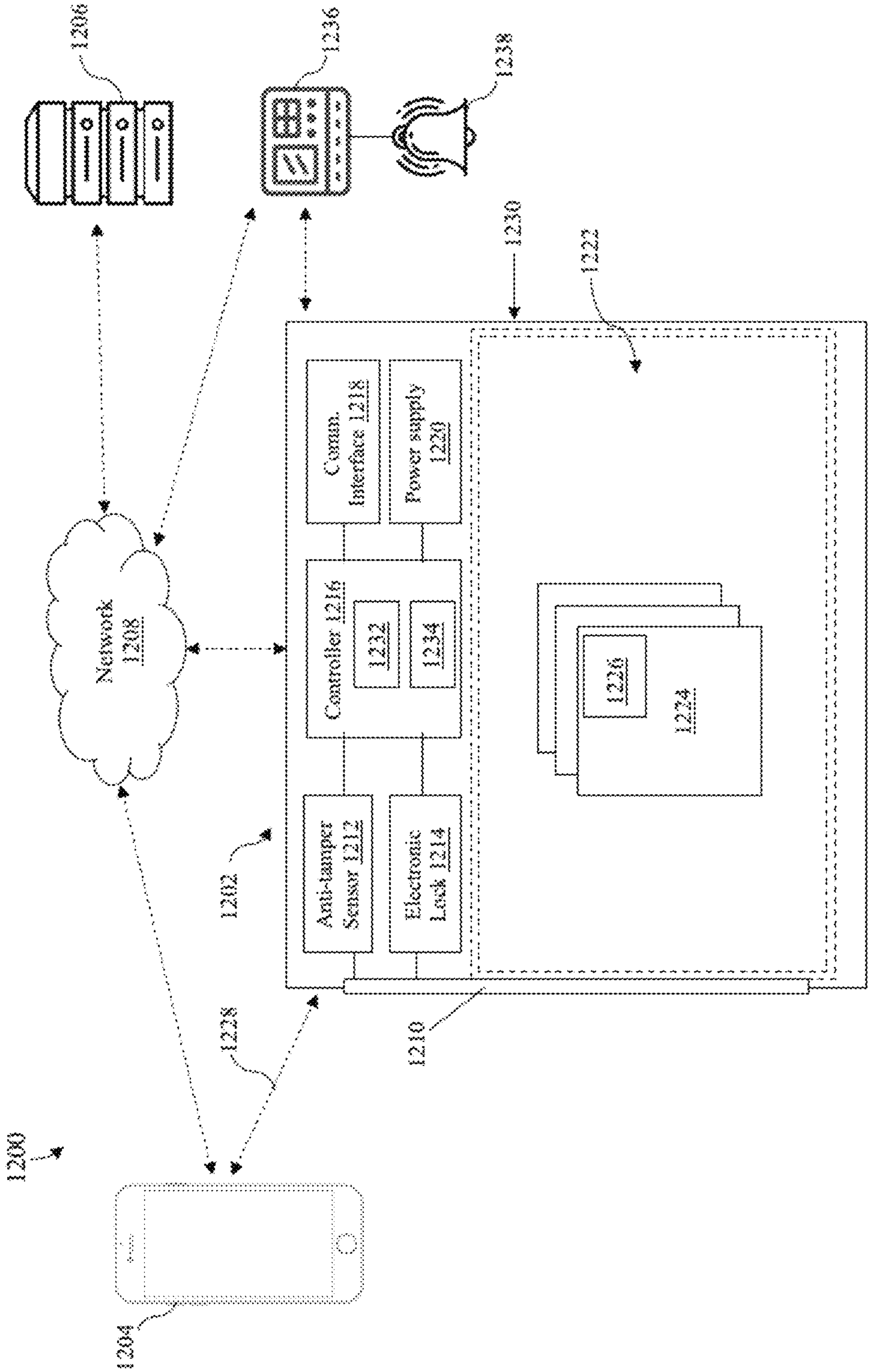
FIG. 12 is an architecture diagram of an electronic access control system comprising a keyless storage apparatus, in accordance with certain aspects of the present disclosure.
Figure 13:
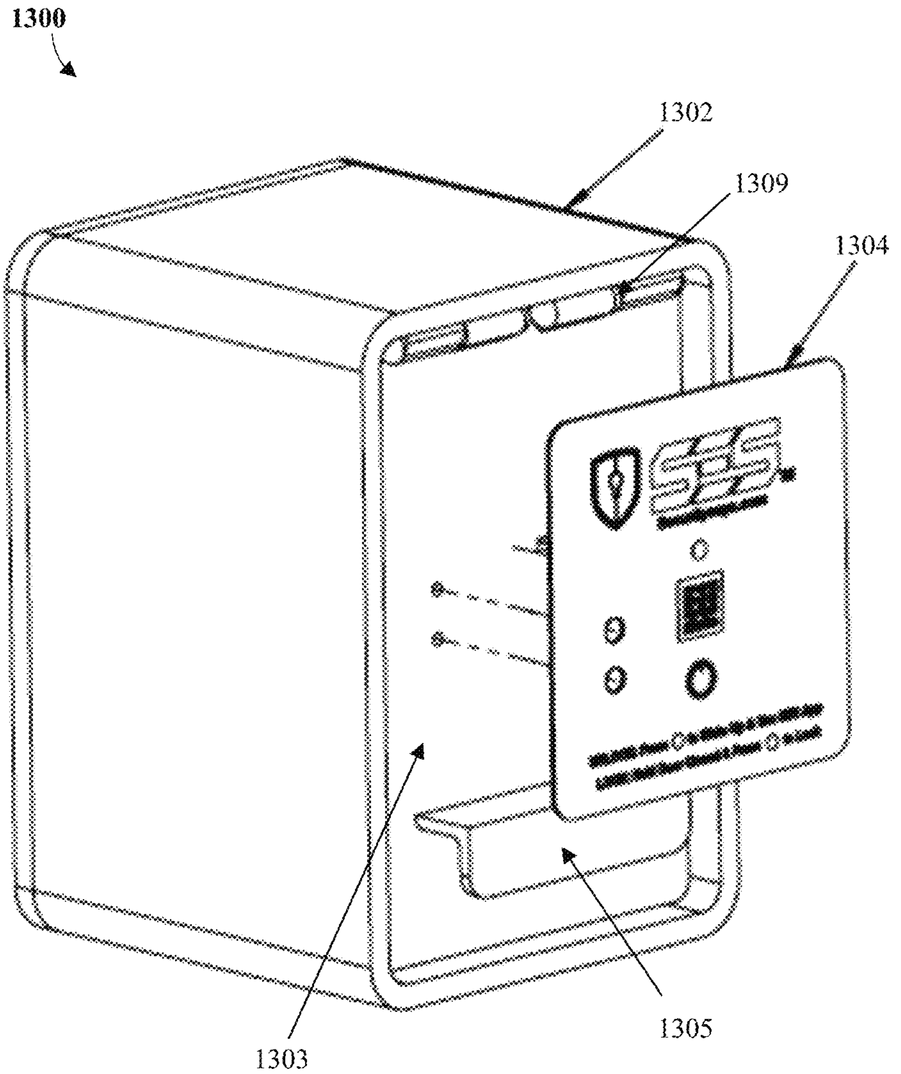
FIG. 13 is a perspective view of a keyless storage apparatus of an electronic access control system, in accordance with certain aspects of the present disclosure.
Figure 14:
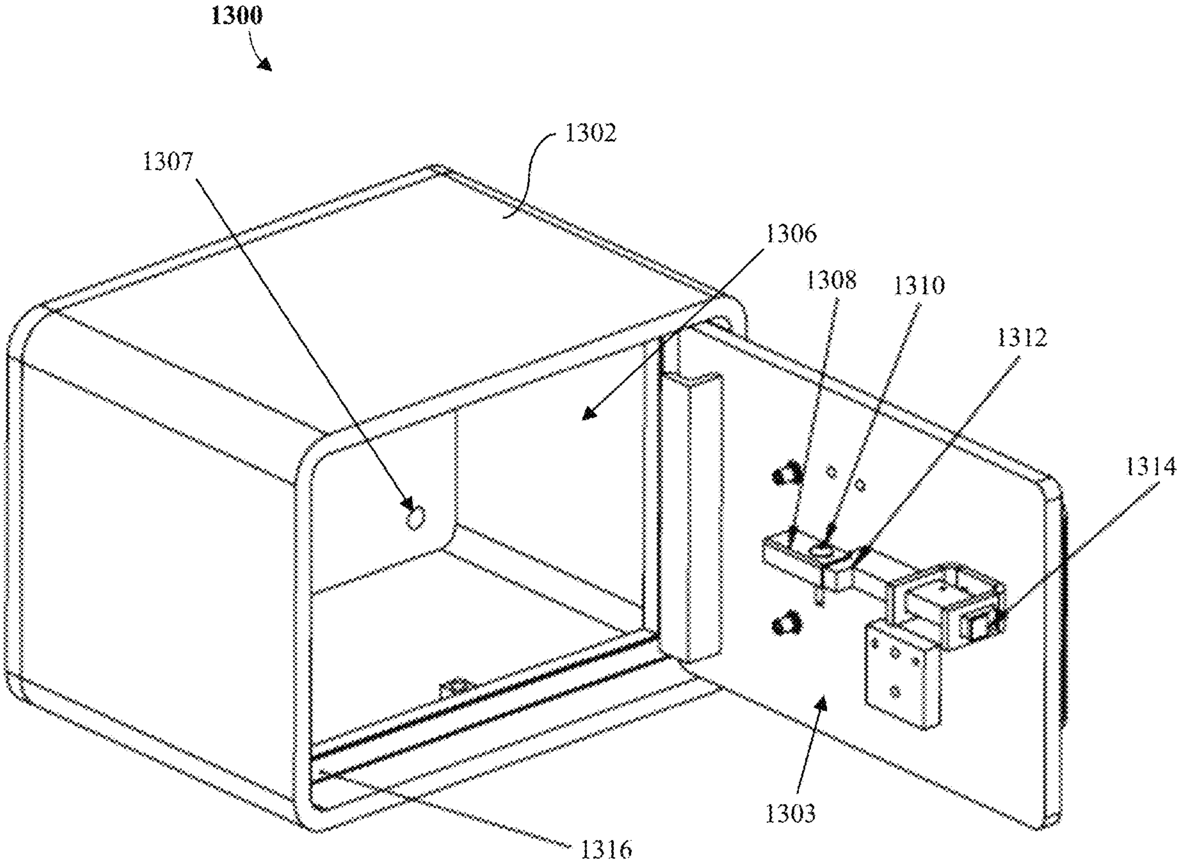
FIG. 14 is a perspective view of a keyless storage apparatus of an electronic access control system, in accordance with certain aspects of the present disclosure.
Figure 15:
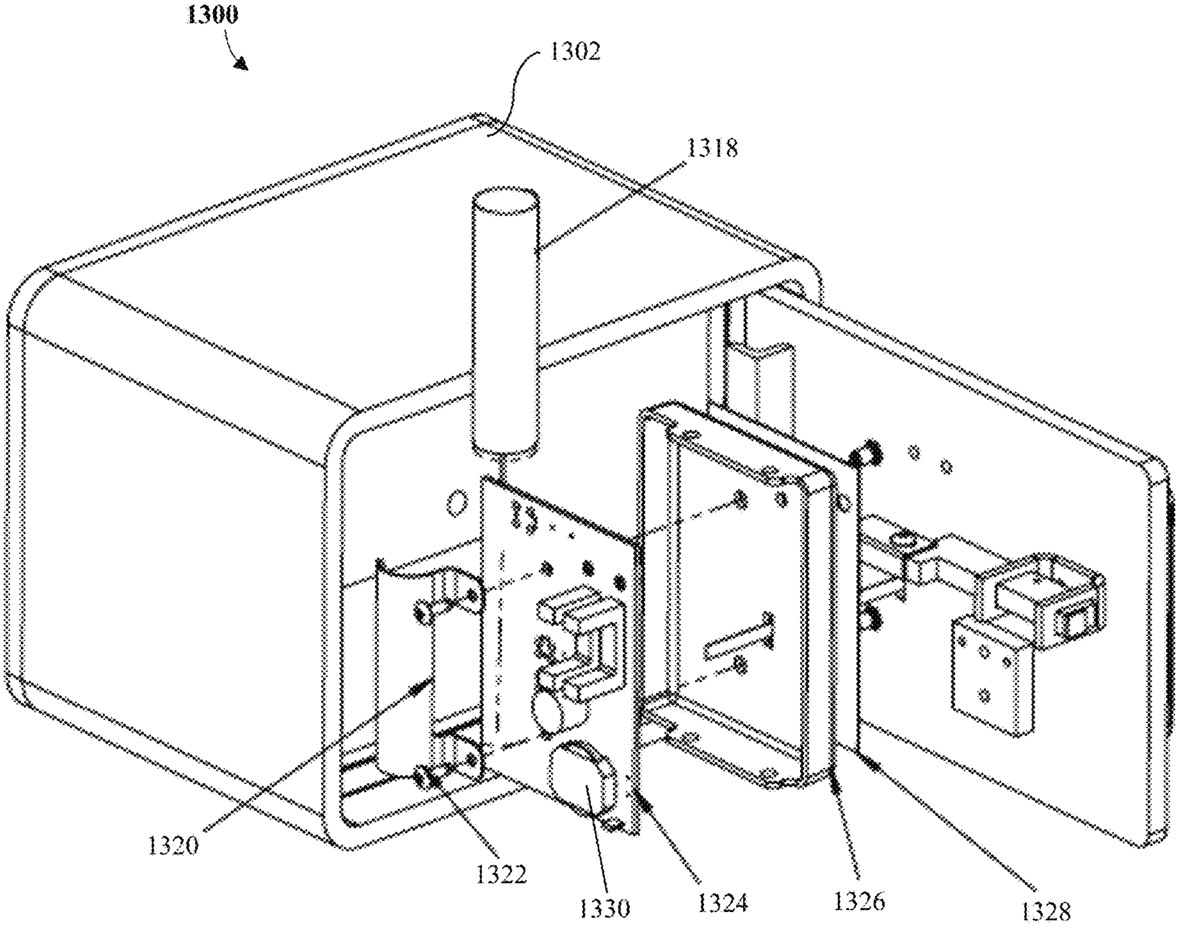
FIG. 15 is a component view of a keyless storage apparatus of an electronic access control system, in accordance with certain aspects of the present disclosure.
Figure 16:
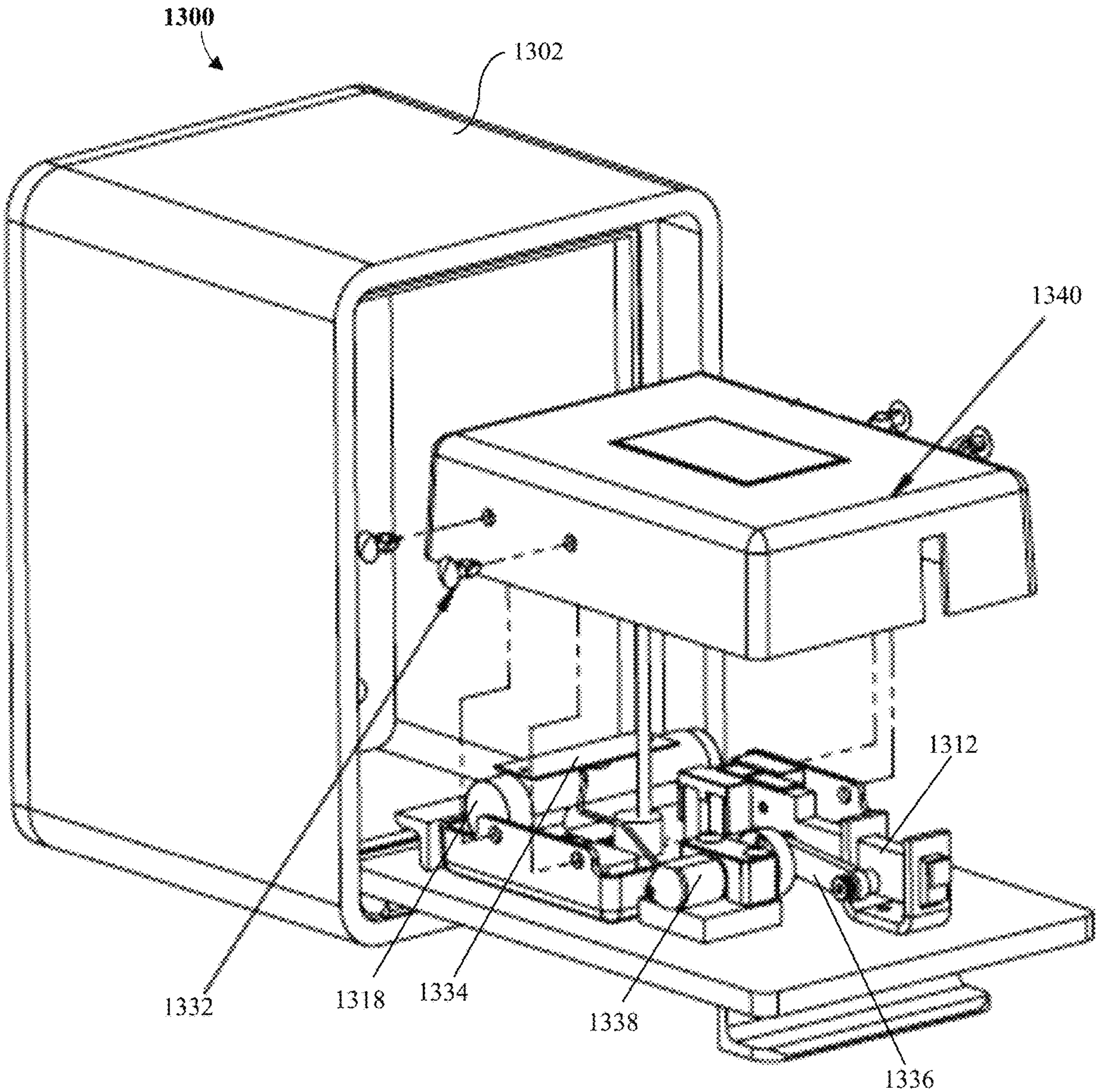
FIG. 16 is a component view of a keyless storage apparatus of an electronic access control system, in accordance with certain aspects of the present disclosure.

Referring now to FIG. 12, an architecture diagram of an electronic access control system 1200 comprising a keyless storage apparatus 1202 is shown. In accordance with certain aspects of the present disclosure, system 1200 comprises keyless storage apparatus 1202, a mobile electronic device 1204 (e.g., a smartphone) and a remote server 1206. In accordance with certain aspects of the present disclosure, keyless storage apparatus 1202 is communicably engaged with mobile electronic device 1204 via a wireless communications interface 1228 (e.g., BLUETOOTH). In accordance with certain aspects of the present disclosure, keyless storage apparatus 1202 may comprise the keyless storage apparatus as shown and described in FIGS. 13-16, below. In accordance with certain aspects of the present disclosure, keyless storage apparatus 1202, mobile electronic device 1204 and remote server 1206 may be communicably engaged over a communications network 1208. In accordance with certain aspects of the present disclosure, certain construction aspects of keyless storage apparatus 1202 may comprise an outer housing 1230, an inner compartment 1222 and an access panel or door 1210 configured to secure access to inner compartment 1222. Door 1210 may be operably engaged with an electronic lock 1214 configured to selectively secure door 1210 against an exterior opening of outer housing 1230 to selectively restrict and grant access to inner compartment 1222. Keyless storage apparatus 1202 may further comprise one or more anti-tamper sensor 1212 configured to detect an unauthorized access attempt for keyless storage apparatus 1202. Anti-tamper sensor 1212 may include one or more sensor types, including but not limited to accelerometers, Hall-effect sensors, inductive sensors, humidity sensors, ambient light sensors and the like. Keyless storage apparatus 1202 may further comprise a controller 1216 comprising one or more micro-processor 1232 and non-transitory computer readable memory device 1234 having instructions stored thereon to command one or more operations of controller 1216 when executed by microprocessor 1232. Controller 1216 may be operably engaged with anti-tamper sensor 1212 to receive one or more sensor inputs to detect an unauthorized access event. Controller 1216 may be operably engaged with electronic lock 1214 to actuate a mechanical locking mechanism and/or electromagnetic locking interface to selectively grant and restrict access to door 1210. Keyless storage apparatus 1202 may further comprise a power supply 1220 operably engaged with controller 1216 to deliver a flow of power from a power source (e.g., a battery) to the electrical components of keyless storage apparatus 1202 (e.g., anti-tamper sensor 1212, electronic lock 1214, controller 1216 and communications interface 1218). Keyless storage apparatus 1202 may further comprise a communications interface (i.e., chipset) 1218 operably engaged with controller 1216 to send and receive one or more wireless data signals to and from mobile electronic device 1204 and/or remote server 1206 via wireless communications interface 1228 and/or communications network 1208. In accordance with certain aspects of the present disclosure, communications interface 1218 may comprise one or more wireless communication modalities, including but not limited to BLUETOOTH, near-field communication, WiFi, LoRA, radio frequency (e.g., RFID), cellular (e.g., 4G, 5G) and the like. In accordance with certain aspects of the present disclosure, keyless storage apparatus 1202 may be communicably engaged with other keyless storage apparatuses and/or electronic access control devices over network 1208 to comprise a mesh network of communicably connected devices.

In accordance with certain aspects of the present disclosure, electronic access control system 1200 may comprise one or more tools/items 1224 optionally comprising one or more identification tags 1226 that are selectively stored in interior compartment 1222 of keyless storage apparatus 1202. The one or more tools/items 1224 may comprise one or more tools or items for granting access to a secured site, such as a physical key or access badge, and/or one or more tools or items for servicing a site, such as a piece of physical equipment (e.g., a wrench). The one or more identification tags 1226 may comprise one or more modalities for tracking use of the one or more tools/items 1224, such as RFID tags, magnets, BLUETOOTH beacon, ultra-wide-band real-time location system (RTLS), WiFi RTLS, infrared RTLS and the like. In accordance with certain aspects of the present disclosure, controller 1216 may record an access event for door 1210 and removal of the one or more tools/items 1224 and store the access and tool check-out in memory. Controller 1216 may record a return/check-in of the one or more tools/items 1224 after the one or more tools/items are returned by the user and may record a lock event of door 1210 after the user's access to keyless storage apparatus 1202 is complete. Controller 1216 may synchronize activity data with remote server 1206 in real-time or according to a batch communication protocol.

Referring now to FIGS. 13-16, perspective views of a keyless storage apparatus 1300 of an electronic access control system are shown. In accordance with certain aspects of the present disclosure, keyless storage apparatus 1300 may be embodied as keyless storage apparatus 1202 within electronic access control system 1200, as shown and described in FIG. 12. In accordance with certain embodiments, keyless storage apparatus 1300 may comprise a housing 1302, a door panel 1303, an interface panel 1304, and a handle 1305. Housing 1302 may be constructed from high-strength steel for enhanced security and durability. Door panel 1303 may be coupled to hinge 1309 to enable door panel 1303 to swing open/closed. Handle 1305 may be securely coupled to a surface of door panel 1303 to enable a user to open/close door panel 1303. Interface panel 1304 may comprise one or more button or input device. In certain embodiments, interface panel 1304 comprises an ON/OFF button as the only button on the interface. In certain embodiments, the ON/OFF button is configured to power on keyless storage apparatus 1300 from a sleep state.

Keyless storage apparatus 1300 may comprise an interior area 1306 that is selectively secured by door panel 1303. Keyless storage apparatus 1300 may comprise one or more mounting hole 1307 configured to receive a screw or bolt and enable housing 1302 to be securely mounted to a surface of a building (e.g., exterior wall) or other structure. Housing 1302 may comprise an interior perimeter 1316 comprising a door stop. Keyless storage apparatus 1300 may comprise a blocker assembly comprising a blocker mount 1308, a blocker mount screw 1310 and a blocker 1312. Blocker 1312 may be constructed from high-strength steel to improve the security and durability of keyless storage apparatus 1300. Blocker 1312 may be selectively configured between a locked position and an unlocked position, described in more detail below. Blocker 1312 may be operably interfaced with interior perimeter 1316 when blocker 1312 is engaged in a locked position to selectively secure (i.e., lock) door panel 1303. Blocker 1312 may be configured to slide behind interior perimeter 1316 such that a surface of interior perimeter 1316 blocks door panel 1303 from opening when blocker 1312 is engaged in the locked position. In certain embodiments, keyless storage apparatus 1300 may include a foam tip 1314 disposed on a distal end of blocker 1312 and configured to create an improved interface between the distal end of blocker 1312 and an inner surface of housing 1302.

Keyless storage apparatus 1300 may comprise an electronics assembly mounted on an interior surface of door panel 1303. The electronics assembly may comprise a circuit board assembly 1324, a controller 1330, and a battery pack 1318. The electronics assembly may be mounted in a potting cup 1326 and coupled to the interior surface of door panel 1303 via adhesive tape 1328. Keyless storage apparatus 1300 may further comprise a battery hold down 1320 configured to retain battery pack 1318 on a surface of circuit board assembly 1324. Screws 1322 may secure battery hold down 1320 to circuit board assembly 1324 and potting cup 1326 to the interior surface of door panel 1303.

Keyless storage apparatus 1300 may further comprise an antenna 1334, optionally installed on a surface of battery pack 1318. Antenna 1334 may be configured to enable one or more wireless communication modalities, including but not limited to BLUETOOTH, near-field communication, WiFi, LoRA, RFID, cellular (e.g., 4G, 5G) and the like. Keyless storage apparatus 1300 may further comprise an electric motor 1338 mounted on the interior surface of door panel 1303. Battery pack 1318 may be operably configured to provide a flow of power to electric motor 1338 and controller 1330 may be configured to operably engage electric motor 1338. Electric motor 1338 may be operably coupled to a drive arm 1336 to actuate drive arm 1336 between a first position and a second position. Drive arm 1336 may be coupled to blocker 1312. In accordance with certain embodiments, drive arm 1336 may be configured to slide blocker 1312 between a locked position and an unlocked position in response to electric motor 1338 actuating drive arm 1336 between the first position and the second position. Keyless storage apparatus 1300 may further comprise an inner housing 1340 configured to house the internal components of keyless storage apparatus 1300 on the inner surface of door panel 1303. Inner housing 1340 may be secured to potting cup 1326 via inner housing screws 1332.

Figure 17:
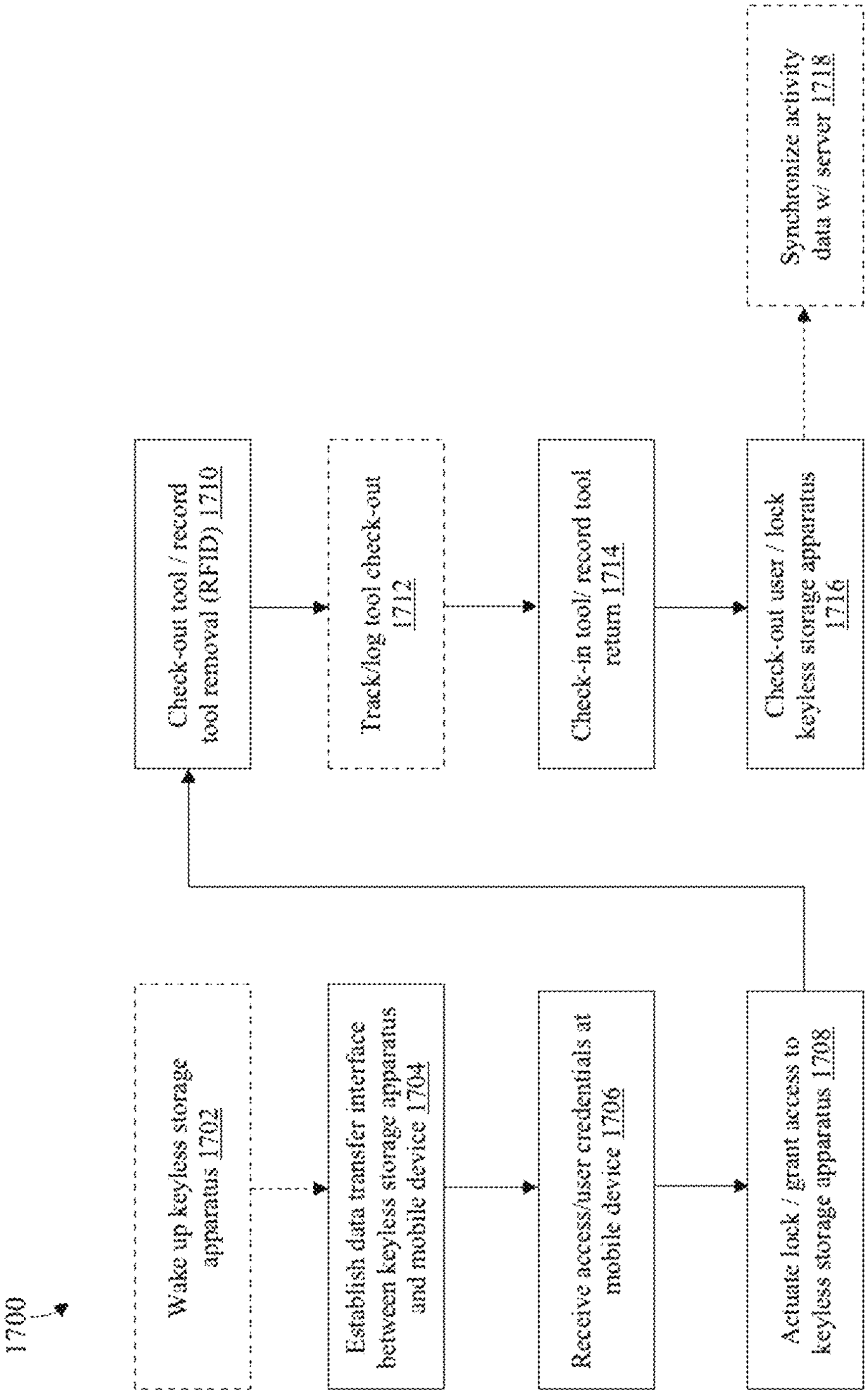
FIG. 17 is a process flow diagram of an electronic access control system and method, in accordance with certain aspects of the present disclosure.

Referring now to FIG. 17, a process flow diagram of a routine 1700 of an electronic access control system is shown. Routine 1700 may be embodied as a method process for implementing one or more aspects of the electronic access control system of the present disclosure. In accordance with certain aspects of the present disclosure, the electronic access control system may comprise electronic access control system 1200, as shown and described in FIG. 12. In accordance with certain aspects of the present disclosure, the electronic access control system may comprise keyless storage apparatus 1300, as shown and described in FIGS. 13-16. In accordance with certain aspects of the present disclosure, routine 1700 may comprise one or more steps or operations for waking up the keyless storage apparatus from a sleep or low-power state (e.g., by pressing a power button on the apparatus) (Step 1702). Routine 1700 may proceed by establishing a data transfer interface between the keyless storage apparatus and a mobile electronic device (e.g., upon receiving a BLUETOOTH advertisement from the mobile electronic device at the controller of the keyless storage apparatus) (Step 1704). Routine 1700 may proceed by executing one or more steps or operations for receiving access/user credentials at the mobile electronic device and communicating the access/user credentials to the controller of the keyless storage apparatus (Step 1706). Routine 1700 may proceed by executing one or more steps or operations for processing the access/user credentials and, upon successfully authenticating the credentials, actuating an electronic locking mechanism of the apparatus door and granting access to the keyless storage apparatus to the requesting user (Step 1708).

In accordance with certain aspects of the present disclosure, the keyless storage apparatus may comprise one or more tools or items stored therein, such as a mechanical key or an access badge, that the requesting user may desire to remove in order to access and/or service a secured location/site. In accordance with certain aspects of the present disclosure, routine 1700 may comprise one or more steps or operations for the user to check-out a tool or item from the keyless storage apparatus (e.g., via a check-out workflow presented at a graphical user interface of the mobile electronic device) and routine 1700 may comprise one or more steps or operations for recording removal of the tool or item from an interior compartment of the keyless storage apparatus in an audit log (Step 1710). Routine 1700 may comprise one or more steps or operations for tracking the item or tool while it is removed from the keyless storage apparatus and logging the tracking data in one or more datastore (Step 1712). Routine 1700 may proceed by executing one or more steps or operations for completing a check-in workflow for the tool/item (e.g., via a graphical user interface rendered at a display of the mobile electronic device) and one or more steps or operations for recording the return of the tool or item to the interior compartment of the keyless storage apparatus in the audit log (Step 1714). Routine 1700 may proceed by executing one or more steps or operations for checking-out the user (e.g., upon verifying return of the tool or item) and actuating the electronic locking mechanism to lock the apparatus door (Step 1716). Routine 1700 may comprise one or more steps or operations for synchronizing the keyless storage device activity data with one or more remote server either in real-time or according to one or more batch communication protocol (Step 1718).

Figure 18:
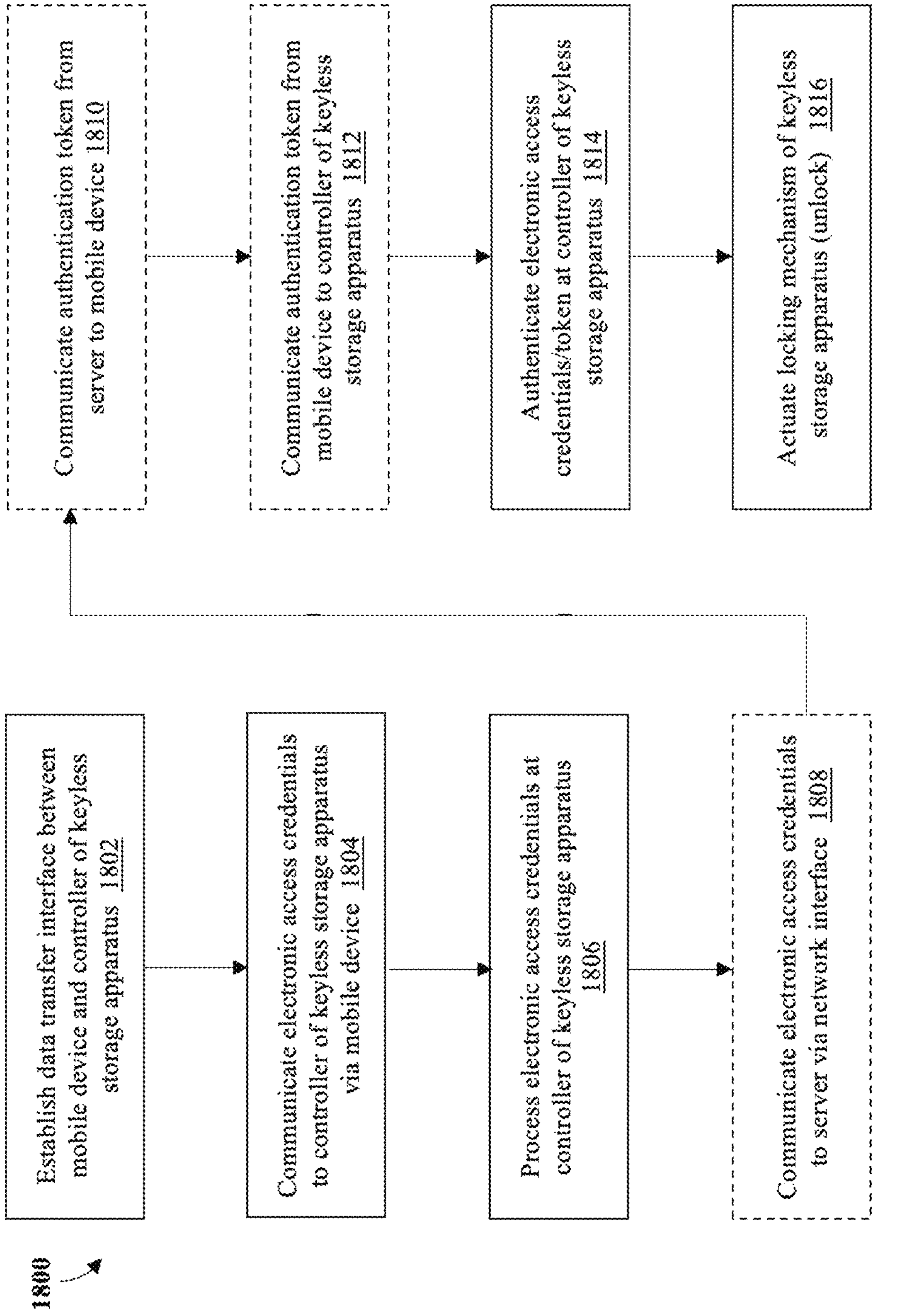
FIG. 18 is a process flow diagram of an electronic access control system and method, in accordance with certain aspects of the present disclosure.

Referring now to FIG. 18, a process flow diagram of a routine 1800 of an electronic access control system is shown. Routine 1800 may be embodied as a method process for implementing one or more aspects of the electronic access control system of the present disclosure. In accordance with certain aspects of the present disclosure, the electronic access control system may comprise electronic access control system 1200, as shown and described in FIG. 12. In accordance with certain aspects of the present disclosure, the electronic access control system may comprise keyless storage apparatus 1300, as shown and described in FIGS. 13-16. Routine 1800 may comprise or embody one or more steps or sub-steps of routine 1700, as shown and described in FIG. 17 and/or may be sequential or concurrent with one or more steps or sub-steps of routine 1700. In accordance with certain aspects of the present disclosure, routine 1800 may comprise one or more steps or operations 1802-1816 for authenticating electronic access credentials received from a mobile electronic device (e.g., a smartphone) to actuate a locking mechanism of the keyless storage apparatus; and optionally, receive an authentication token from a remote EAC server to authenticate the electronic access credentials. Routine 1800 may comprise one or more steps or operations for establishing a wireless data transfer interface between a mobile electronic device (e.g., mobile electronic device 1204 of FIG. 12) and a controller of a keyless storage apparatus (e.g., keyless storage apparatus 1202 of FIG. 12) (Step 1802). In certain embodiments, the wireless data transfer interface may comprise a BLUETOOTH communications interface. Routine 1800 may proceed by executing one or more steps or operations for communicating one or more electronic access credentials (e.g., an electronic access code) from the mobile electronic device to the controller of the keyless storage apparatus via the wireless data transfer interface (Step 1804). The electronic access credentials may comprise an electronic access request from a user of the mobile electronic device to access the keyless storage apparatus. Routine 1800 may proceed by executing one or more steps or operations for processing the electronic access credentials at the controller of the keyless storage apparatus to authenticate the access request (Step 1806). Routine 1800 may optionally proceed by executing one or more steps or operations for communicating the electronic access credentials (e.g., via the mobile electronic device and/or the controller of the keyless storage apparatus) to an EAC server via a network communications interface (Step 1808). The EAC server may be configured to process the electronic access credentials to generate an authentication token for the mobile electronic device and communicate the authentication token to the mobile electronic device and/or the controller of the keyless storage apparatus (Step 1810). In certain embodiments where the EAC server is configured to communicate the authentication token to the mobile electronic device, routine 1900 may comprise one or more steps or operations for communicating the authentication token from the mobile electronic device to the controller of the keyless storage apparatus (Step 1812). Routine 1800 may proceed by executing one or more steps or operations for authenticating the electronic access credentials and the authentication token at the controller of the keyless storage apparatus (Step 1814). In response to successfully authenticating the electronic access credentials and the authentication token at the controller of the keyless storage apparatus, routine 1800 may proceed by executing one or more steps or operations for communicating a command signal from the controller to an electronic actuator of the keyless storage apparatus to actuate the locking mechanism of the keyless storage apparatus to unlock the door or access panel of the keyless storage apparatus and grant access to the interior area to the user of the mobile electronic device.

Figure 19:
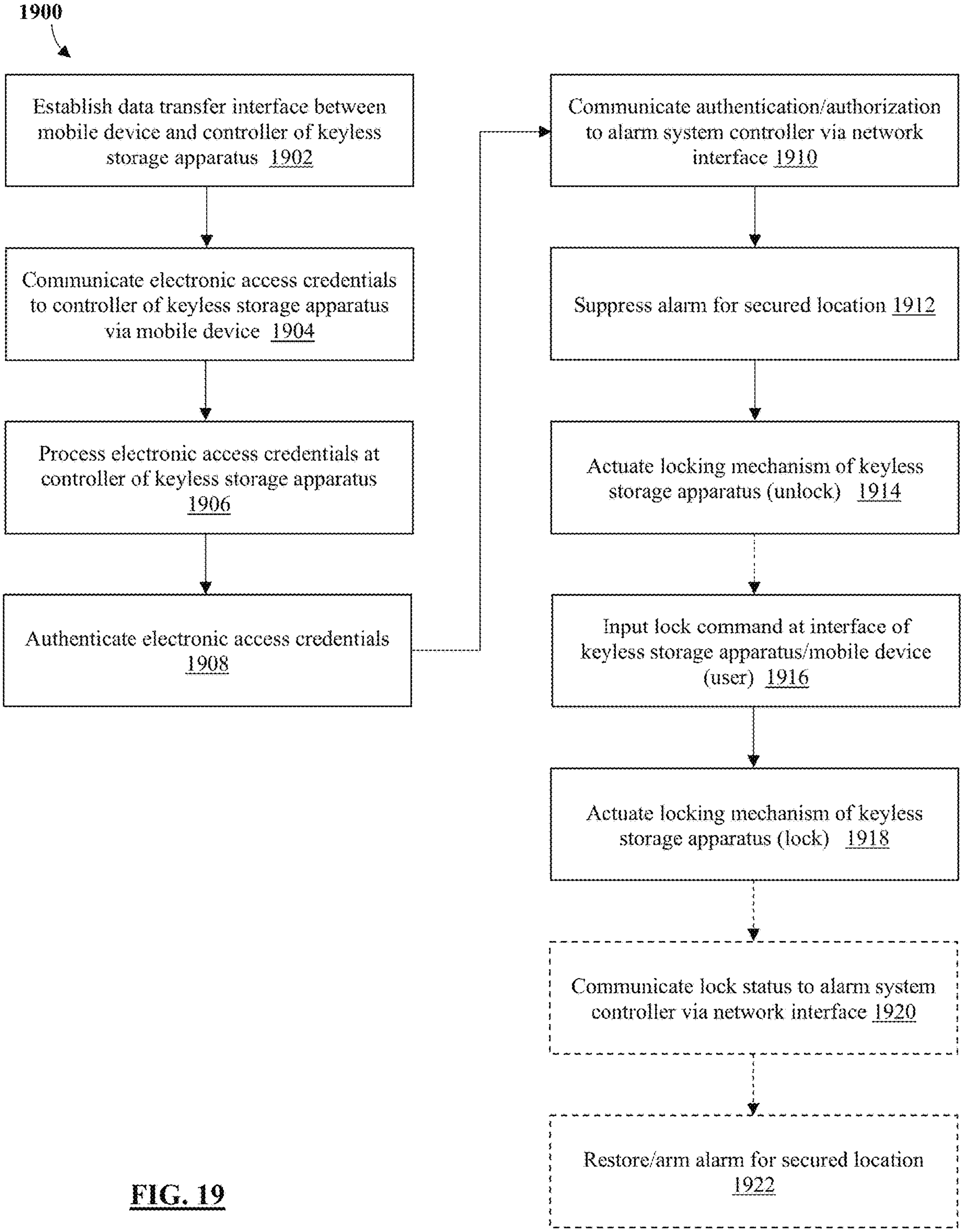
FIG. 19 is a process flow diagram of an electronic access control system and method, in accordance with certain aspects of the present disclosure.

Referring now to FIG. 19, a process flow diagram of a routine 1900 for an electronic access control system is shown. Routine 1900 may be embodied as a method process for implementing one or more aspects of the electronic access control system of the present disclosure. In accordance with certain aspects of the present disclosure, the electronic access control system may comprise electronic access control system 1200, as shown and described in FIG. 12. In accordance with certain aspects of the present disclosure, the electronic access control system may comprise keyless storage apparatus 1300, as shown and described in FIGS. 13-16. Routine 1900 may comprise or embody one or more steps or sub-steps of routines 1700-1800, as shown and described in FIGS. 17-18 and/or may be sequential or concurrent with one or more steps or sub-steps of routines 1700-1800.

In accordance with certain aspects of the present disclosure, routine 1900 may comprise one or more steps or operations 1902-1922 for authenticating electronic access credentials received from a mobile electronic device (e.g., a smartphone) to actuate a locking mechanism of the keyless storage apparatus and provide one or more communications to a networked alarm system controller. Routine 1900 may comprise one or more steps or operations for establishing a wireless data transfer interface between a mobile electronic device (e.g., mobile electronic device 1204 of FIG. 12) and a controller of a keyless storage apparatus (e.g., keyless storage apparatus 1202 of FIG. 12) (Step 1902). In certain embodiments, the wireless data transfer interface may comprise a BLUETOOTH communications interface. Routine 1900 may proceed by executing one or more steps or operations for communicating one or more electronic access credentials (e.g., an electronic access code) from the mobile electronic device to the controller of the keyless storage apparatus via the wireless data transfer interface (Step 1904). The electronic access credentials may comprise an electronic access request from a user of the mobile electronic device to access the keyless storage apparatus. Routine 1900 may proceed by executing one or more steps or operations for processing the electronic access credentials at the controller of the keyless storage apparatus to authenticate the access request (Step 1906). Routine 1900 may proceed by executing one or more steps or operations for authenticating the electronic access credentials at the controller of the keyless storage apparatus (Step 1908) and, in response to successfully authenticating the electronic access credentials, communicating authorization and/or authentication data for the user to an alarm system controller communicably engaged with the controller via a network interface (Step 1910). The alarm system controller may be configured to process the authorization and/or authentication data (e.g., according to one or more alarm system protocols) to suppress an alarm for at least one secured location (Step 1912) and providing at least one communication to the controller of the keyless storage device to indicate the alarm has been suppressed. In response to receiving the communication from the alarm system controller, the controller of the keyless storage device may execute one or more steps or operations to command an electronic actuator of the keyless storage apparatus to actuate a locking mechanism of the keyless storage apparatus from a locked position to an unlocked position (Step 1914). The user may then open the door/panel at the keyless storage apparatus in order to access the contents therein. In certain embodiments, the keyless storage apparatus may contain a mechanical key, key card and/or key tag configured to grant access to a location secured by the alarm. Once the user has completed its task, the user may input a "lock" command at an interface of the keyless storage apparatus or via an interface of the mobile electronic device (Step 1916). The controller of the keyless storage apparatus may process the lock command and may execute one or more steps or operations to command the electronic actuator of the keyless storage apparatus to actuate the locking mechanism of the keyless storage apparatus from the unlocked position to the locked position (Step 1918). Routine 1900 may optionally comprise one or more steps or operations for communicating a lock status to the alarm system controller via the network interface (Step 1920). The alarm system controller may perform one or more steps or operations to process the lock status for the keyless storage apparatus and restore or arm the alarm for the secured location (Step 1922).

Figure 20:
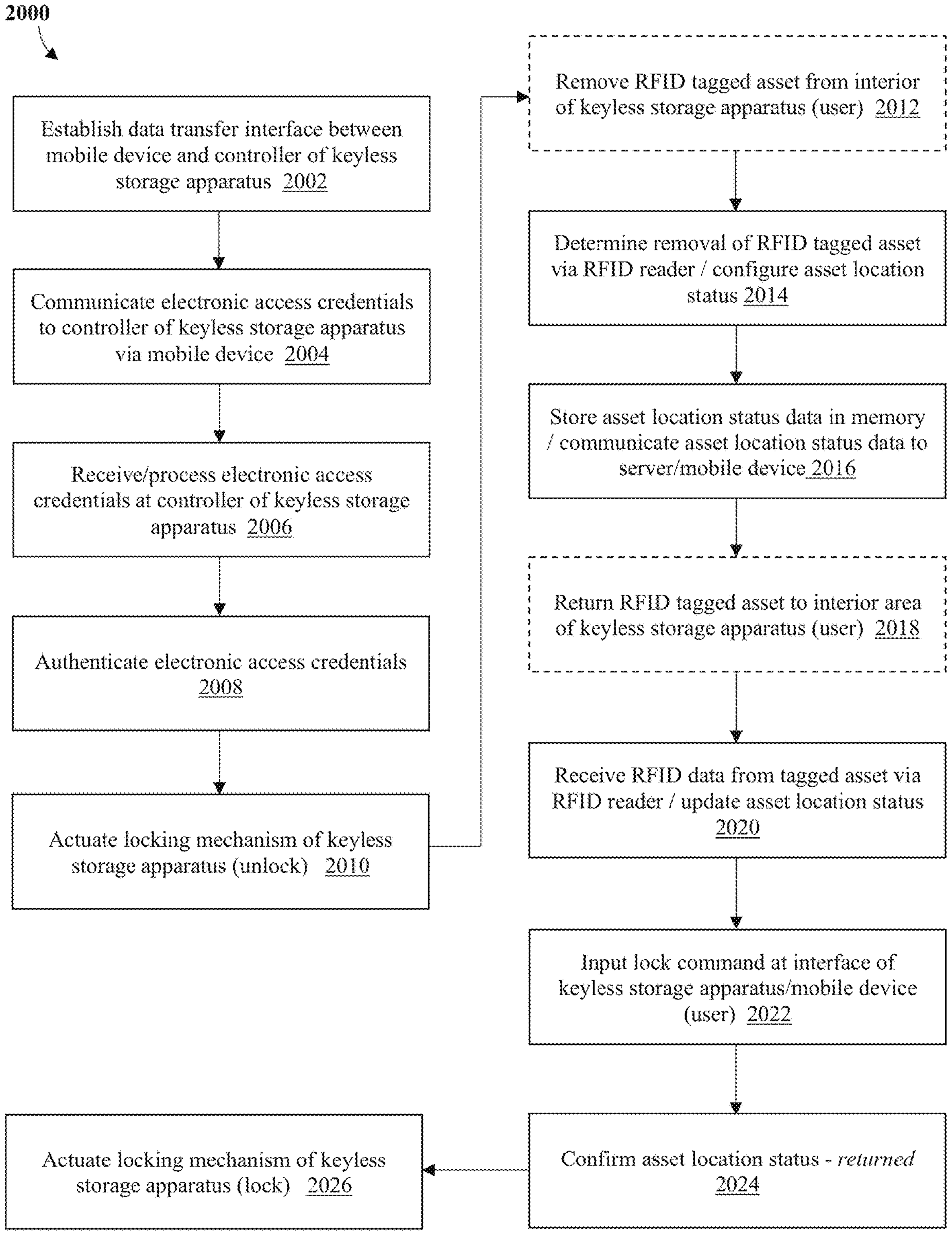
FIG. 20 is a process flow diagram of an electronic access control system and method, in accordance with certain aspects of the present disclosure.

Referring now to FIG. 20, a process flow diagram of a routine 2000 for an electronic access control system is shown. Routine 2000 may be embodied as a method process for implementing one or more aspects of the electronic access control system of the present disclosure. In accordance with certain aspects of the present disclosure, the electronic access control system may comprise electronic access control system 1200, as shown and described in FIG. 12. In accordance with certain aspects of the present disclosure, the electronic access control system may comprise keyless storage apparatus 1300, as shown and described in FIGS. 13-16. Routine 2000 may comprise or embody one or more steps or sub-steps of routines 1700-1900, as shown and described in FIGS. 17-19 and/or may be sequential or concurrent with one or more steps or sub-steps of routines 1700-1900.

In accordance with certain aspects of the present disclosure, routine 2000 may comprise one or more steps or operations 2002-2026 for actuating a locking mechanism of the keyless storage apparatus and tracking at least one physical asset stored therein. Routine 2000 may comprise one or more steps or operations for establishing a wireless data transfer interface between a mobile electronic device (e.g., mobile electronic device 1204 of FIG. 12) and a controller of a keyless storage apparatus (e.g., keyless storage apparatus 1202 of FIG. 12) (Step 2002). In certain embodiments, the wireless data transfer interface may comprise a BLUETOOTH communications interface. Routine 2000 may proceed by executing one or more steps or operations for communicating one or more electronic access credentials (e.g., an electronic access code) from the mobile electronic device to the controller of the keyless storage apparatus via the wireless data transfer interface (Step 2004). The electronic access credentials may comprise an electronic access request from a user of the mobile electronic device to access the keyless storage apparatus. Routine 2000 may proceed by executing one or more steps or operations for processing the electronic access credentials at the controller of the keyless storage apparatus to authenticate the access request (Step 2006). Routine 1900 may proceed by executing one or more steps or operations for authenticating the electronic access credentials at the controller of the keyless storage apparatus (Step 2008). In response to successfully authenticating the electronic access credentials, the controller of the keyless storage apparatus may execute one or more steps or operations to command an electronic actuator of the keyless storage apparatus to actuate a locking mechanism of the keyless storage apparatus from a locked position to an unlocked position (Step 2010). The user may then open the door/panel at the keyless storage apparatus in order to access the contents therein.

In certain embodiments, the keyless storage apparatus may contain one or more physical asset (e.g., a tool, a key, a keycard, an electronic device, etc.) The physical asset may comprise an RFID tag comprising identification data stored thereon for identifying the physical asset. In accordance with certain aspects of the present disclosure, the user may remove an RFID-tagged physical asset from the interior area of the keyless storage apparatus (Step 2012). Routine 2000 may comprise one or more steps or operations for determining/sensing the removal of the RFID-tagged physical asset via an RFID reader communicably engaged with the controller of the keyless storage apparatus; and configuring a location status data for the physical asset at the controller of the keyless storage apparatus (Step 2014). Routine 2000 may comprise one or more steps or operations for storing the location status data for the physical asset in memory of the controller and/or communicating the location status data to at least one EAC server via a network communications interface and/or to the mobile electronic device via the wireless data transfer interface (Step 2016). In accordance with certain aspects of the present disclosure, once the user is finished with the RFID-tagged physical asset, the user returns the asset to the interior area of the keyless storage apparatus (Step 2018). In accordance with certain embodiments, routine 2000 may proceed by executing one or more steps or operations for receiving RFID identification data from the RFID-tagged physical asset via the RFID reader and updating the location status for the physical asset via the controller (Step 2020). In accordance with certain aspects of the present disclosure, once the user has returned the RFID-tagged physical asset to the interior area of the keyless storage apparatus, the user may input a "lock" command at an interface of the keyless storage apparatus or via an interface of the mobile electronic device (Step 2022). Routine 2000 may proceed by executing one or more steps or operations to confirm (e.g., via the controller and/or the EAC server) that the RFID-tagged physical asset has been returned to the interior area of the keyless storage apparatus and the location status for the asset shows "returned" (Step 2024). Upon confirming the location status of the RFID-tagged physical asset as "returned," the controller of the keyless storage apparatus may perform one or more steps or operations to command the electronic actuator of the keyless storage apparatus to actuate the locking mechanism of the keyless storage apparatus from the unlocked position to the locked position (Step 2026).

Figure 21:
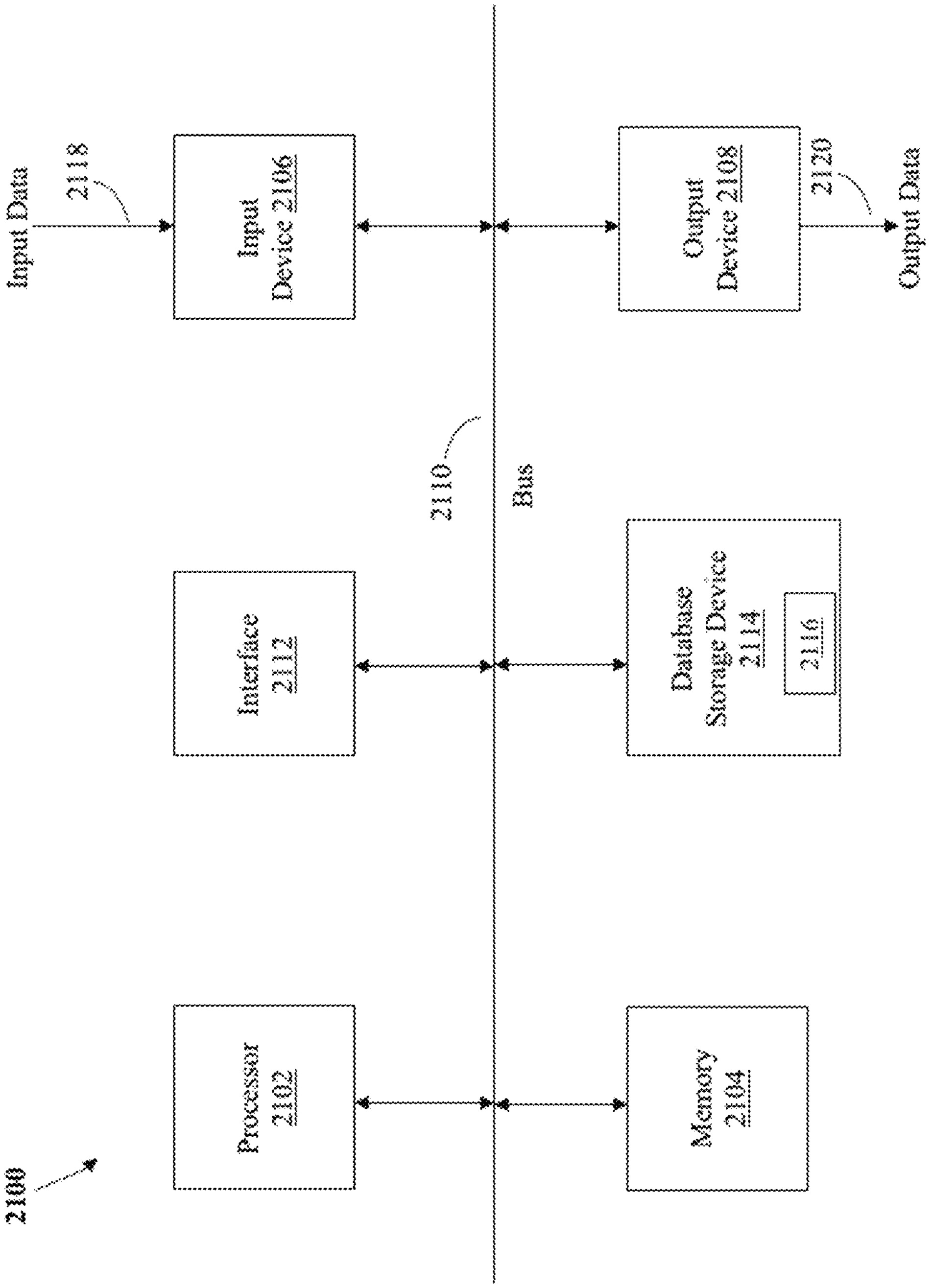
FIG. 21 is an illustrative embodiment of a computing device through which one or more aspects of the present disclosure may be implemented.

Referring now to FIG. 21, a processing system 2100 in which one or more aspects of the present disclosure may be implemented is shown. For example, processing system 2100 may comprise one or more devices and systems of the present disclosure including, but not limited to, one or more mobile electronic device, server, alarm system controller, electronic access controller, electronic access control system interface, and the like. According to an embodiment, processing system 2100 may generally comprise at least one processor 2102, or processing unit or plurality of processors, a memory 2104, at least one input device 2106 and at least one output device 2108, coupled together via a bus or group of buses 2110. In certain embodiments, input device 2106 and output device 2108 could be the same device. An interface 2112 can also be provided for coupling the processing system 2100 to one or more peripheral devices; for example, interface 2112 could be a PCI card or PC card. At least one storage device 2114 which houses at least one database 2116 can also be provided. The memory 2104 can be any form of memory device, for example, volatile or non-volatile memory, solid state storage devices, magnetic devices, etc. The processor 2102 could comprise more than one distinct processing device, for example to handle different functions within the processing system 2100. Input device 2106 receives input data 2118 and can comprise, for example, a keyboard, a pointer device such as a pen-like device or a mouse, audio receiving device for voice-controlled activation such as a microphone, data receiver or antenna (e.g., radio frequency transceiver), a modem or wireless data adaptor, data acquisition card, etc. Input data 2118 could come from different sources, for example keyboard instructions in conjunction with data received via a network. Output device 2108 produces or generates output data 2120 and can comprise, for example, a display device or monitor in which case output data 2120 is visual, a printer in which case output data 2120 is printed, a port for example a USB port, a peripheral component adaptor, a data transmitter or antenna such as a modem or wireless network adaptor, BLUETOOTH, NFC, RFID, LoRA, etc. Output data 2120 could be distinct and derived from different output devices, for example a visual display on a monitor in conjunction with data transmitted to a network. A user could view data output, or an interpretation of the data output, on, for example, a monitor or using a printer. The storage device 2114 can be any form of data or information storage means, for example, volatile or non-volatile memory, solid state storage devices, magnetic devices, etc.

In use, the processing system 2100 is adapted to allow data or information to be stored in and/or retrieved from, via wired or wireless communication means, at least one database 2116. The interface 2112 may allow wired and/or wireless communication between the processing unit 2102 and peripheral components that may serve a specialized purpose. In general, the processor 2102 can receive instructions as input data 2118 via input device 2106 and can display processed results or other output to a user by utilizing output device 2108. More than one input device 2106 and/or output device 2108 can be provided. It should be appreciated that the processing system 2100 may be any form of terminal, server, specialized hardware, or the like.

It is to be appreciated that the processing system 2100 may be a part of a networked communications system. Processing system 2100 could connect to a network, for example the Internet or a WAN. Input data 2118 and output data 2120 could be communicated to other devices via the network. The transfer of information and/or data over the network can be achieved using wired communications means or wireless communications means. A server can facilitate the transfer of data between the network and one or more databases. A server and one or more databases provide an example of an information source.

Thus, the processing computing system environment 2100 illustrated in FIG. 21 may operate in a networked environment using logical connections to one or more remote computers. The remote computer may be a personal computer, a server, a router, a network PC, a peer device, or other common network node, and typically includes many or all of the elements described above.

It is to be further appreciated that the logical connections depicted in FIG. 21 include a local area network (LAN) and a wide area network (WAN) but may also include other networks such as a personal area network (PAN). Such networking environments are commonplace in offices, enterprise-wide computer networks, intranets, and the Internet. For instance, when used in a LAN networking environment, the computing system environment 2100 is connected to the LAN through a network interface or adapter. When used in a WAN networking environment, the computing system environment typically includes a modem or other means for establishing communications over the WAN, such as the Internet. The modem, which may be internal or external, may be connected to a system bus via a user input interface, or via another appropriate mechanism. In a networked environment, program modules depicted relative to the computing system environment 2100, or portions thereof, may be stored in a remote memory storage device. It is to be appreciated that the illustrated network connections of FIG. 21 are exemplary and other means of establishing a communications link between multiple computers may be used.

FIG. 21 is intended to provide a brief, general description of an illustrative and/or suitable exemplary environment in which embodiments of the below described present invention may be implemented. FIG. 21 is an example of a suitable environment and is not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

As provided in the preceding detailed description of the several views of the drawings, certain embodiments have been described with reference to acts and symbolic representations of operations that are performed by one or more computing devices, such as the computing system environment 2100 of FIG. 21. As such, it will be understood that such acts and operations, which are at times referred to as being computer-executed, include the manipulation by the processor of the computer of electrical signals representing data in a structured form. This manipulation transforms the data or maintains them at locations in the memory system of the computer, which reconfigures or otherwise alters the operation of the computer in a manner understood by those skilled in the art. The data structures in which data is maintained are physical locations of the memory that have particular properties defined by the format of the data. However, while an embodiment is being described in the foregoing context, it is not meant to be limiting as those of skill in the art will appreciate that the acts and operations described hereinafter may also be implemented in hardware.

Embodiments may be implemented with numerous other general-purpose or special-purpose computing devices and computing system environments or configurations, including, but not limited to, those provided herein. Examples of well-known computing systems, environments, and configurations that may be suitable for use with an embodiment include, but are not limited to, smart phones, tablet computers, electronic access control devices, personal computers, handheld or laptop devices, personal digital assistants, multiprocessor systems, microprocessor-based systems, set top boxes, programmable consumer electronics, network, minicomputers, server computers, electronic access control server computers, alarm system server computers, web server computers, mainframe computers, and distributed computing environments that include any of the above systems or devices.

Embodiments may be described in a general context of computer-executable instructions, such as program modules, being executed by a computer. Generally, program modules include routines, programs, objects, components, data structures, etc., that perform particular tasks or implement particular abstract data types. An embodiment may also be practiced in a distributed computing environment where tasks are performed by remote processing devices that are linked through a communications network. In a distributed computing environment, program modules may be located in both local and remote computer storage media including memory storage devices.

In accordance with certain aspects of the present disclosure, an illustrative embodiment of an electronic access control system may comprise a controller; an electronic lock assembly operably engaged with the controller, and a keyed lock assembly comprising a lock cylinder. The electronic lock assembly may comprise an electronic actuator operably engaged with a locking mechanism configured to selectively restrict access to a door or an access point of an enclosure when the locking mechanism is configured in a locked configuration and selectively enable access to the door or the access point of the enclosure when the locking mechanism is configured in an unlocked configuration. The electronic actuator may be configured to actuate the locking mechanism between the locked configuration and the unlocked configuration in response to a command signal from the controller. The keyed lock assembly may comprise a keyed lock driver operably coupled to the lock cylinder, and a flange extending from a distal end of the keyed lock driver. The keyed lock driver may be configured to receive a mechanical key at a proximal end of the keyed lock driver. The keyed lock driver may be configured wherein, upon receiving the mechanical key, the keyed lock driver is configured to rotate the flange around an axis of the lock cylinder. In certain embodiments, upon rotating the flange, the flange is configured to operably interface with the electronic lock assembly to disengage the locking mechanism.

The electronic access control system of the present disclosure may be further configured wherein the controller further comprises a processor, a data transfer interface communicably engaged with the processor, and a non-transitory computer readable medium communicably engaged with the processor and comprising processor-executable instructions stored thereon that, when executed, command the processor to perform one or more operations, the one or more operations comprising: receiving an electronic access code from an input device via the data transfer interface; processing the electronic access code to authorize an electronic access request; and in response to authorizing the electronic access request, commanding the electronic actuator to actuate the locking mechanism.

The electronic access control system of the present disclosure may be further configured wherein the electronic lock assembly further comprises a switch or a sensor communicably engaged with the controller, wherein the switch or the sensor is configured to detect at least one position of the flange when rotated by the keyed lock driver.

The electronic access control system of the present disclosure may be further configured wherein the data transfer interface comprises a wireless communications module.

The electronic access control system of the present disclosure may be further configured wherein the one or more operations of the processor further comprise establishing a wireless communications interface with the input device, wherein the input device comprises a mobile electronic device.

The electronic access control system of the present disclosure may be further configured wherein the one or more operations of the processor further comprise establishing a wireless communications interface with at least one remote server.

The electronic access control system of the present disclosure may be further configured wherein the controller is communicably engaged with at least one alarm system controller via the data transfer interface.

The electronic access control system of the present disclosure may be further configured wherein the one or more operations of the processor further comprise communicating a first command signal to the at least one alarm system controller in response to the switch or the sensor detecting a first position of the flange, wherein the at least one alarm system controller is configured to suppress at least one alarm for the door or the access point of the enclosure in response to the first command signal.

The electronic access control system of the present disclosure may be further configured wherein the one or more operations of the processor further comprise communicating an override signal to the at least one remote server in response to the flange disengaging the locking mechanism.

The electronic access control system of the present disclosure may be further configured wherein the one or more operations of the processor further comprise communicating a second command signal to the at least one alarm system controller in response to the switch or the sensor detecting a second position of the flange, wherein the at least one alarm system controller is configured to restore the at least one alarm for the door or the access point of the enclosure in response to the second command signal.

In accordance with certain aspects of the present disclosure, an illustrative embodiment of an electronic access control apparatus may comprise an electronic lock assembly and a keyed lock assembly. The electronic lock assembly may comprise a controller, an electronic actuator operably engaged with the controller, a latching mechanism operably engaged with the electronic actuator, and a blocking plate configured to be operably interfaced with a handle of a door or an access point of an enclosure. The electronic actuator may be configured to actuate the latching mechanism between a locked position and an unlocked position in response to a command signal from the controller. The blocking plate may be configured to be selectively interfaced with the latching mechanism when the latching mechanism is positioned in the locked position such that the blocking plate and the latching mechanism are operably configured to lock the handle of the door or the access point of the enclosure. The keyed lock assembly may comprise a lock cylinder, a keyed lock driver operably coupled to the lock cylinder, and a flange extending from a distal end of the keyed lock driver. The keyed lock driver may be configured to receive a mechanical key at a proximal end of the keyed lock driver, wherein the proximal end of the keyed lock driver is configured to be operably installed on an exterior surface of the door or the access point of the enclosure. In certain embodiments, upon receiving the mechanical key, the keyed lock driver is configured to rotate the flange around an axis of the lock cylinder. In certain embodiments, upon rotating the flange in a first direction, the flange is configured to apply force to the latching mechanism to position the latching mechanism from the locked position to the unlocked position.

The electronic access control apparatus of the present disclosure may be further configured wherein the electronic actuator comprises a solenoid.

The electronic access control apparatus of the present disclosure may be further configured wherein the latching mechanism comprises a retractable plunger operably engaged with the solenoid.

The electronic access control apparatus of the present disclosure may be further configured wherein the electronic lock assembly comprises a protrusion extending laterally from a surface of the electronic lock assembly, wherein the flange is configured to operably interface with the protrusion to apply the force to the latching mechanism to position the latching mechanism from the locked position to the unlocked position.

The electronic access control apparatus of the present disclosure may be further configured wherein, upon rotating the flange in a second direction, the electronic actuator is configured to position the latching mechanism to the locked position.

The electronic access control apparatus of the present disclosure may be further configured wherein the electronic actuator comprises an electric motor comprising at least one gear and a driveline.

The electronic access control apparatus of the present disclosure may be further configured wherein the controller further comprises a processor, a data transfer interface communicably engaged with the processor, and a non-transitory computer readable medium communicably engaged with the processor and comprising processor-executable instructions stored thereon that, when executed, command the processor to perform one or more operations, the one or more operations comprising: receiving an electronic access code from an input device via the data transfer interface; processing the electronic access code to authorize an electronic access request; and in response to authorizing the electronic access request, commanding the electronic actuator to actuate the latching mechanism from the locked position to the unlocked position.

The electronic access control apparatus of the present disclosure may be further configured wherein the electronic lock assembly further comprises a switch or a sensor communicably engaged with the controller, wherein the switch or the sensor is configured to detect at least one position of the flange when rotated by the keyed lock driver.

The electronic access control apparatus of the present disclosure may be further configured wherein the data transfer interface comprises a wireless communications module.

The electronic access control apparatus of the present disclosure may be further configured wherein the one or more operations of the processor further comprise establishing a wireless communications interface with the input device, wherein the input device comprises a mobile electronic device.

The electronic access control apparatus of the present disclosure may be further configured wherein the one or more operations of the processor further comprise establishing a wireless communications interface with at least one remote server.

The electronic access control apparatus of the present disclosure may be further configured wherein the lock driver is configured to retain the mechanical key when the lock driver is rotated.

In accordance with certain aspects of the present disclosure, an illustrative embodiment of an electronic access control method may comprise one or more steps or operations comprising: receiving, with a controller of an electronic lock assembly, an electronic access code from at least one input device via a data transfer interface, wherein the electronic lock assembly is operably installed at an access point of an enclosure and configured to selectively restrict and enable access to the access point of the enclosure, wherein the electronic lock assembly comprises an electronic actuator and a locking mechanism operably engaged with the electronic actuator, wherein the electronic actuator is configured to actuate the locking mechanism between a locked position and an unlocked position in response to a command signal from the controller; processing, with at least one processor, the electronic access code to authorize an electronic access request for the access point of the enclosure; commanding, with the controller, the electronic actuator to actuate the locking mechanism from the locked position to the unlocked position in response to authorizing the electronic access request with the least one processor; and in response to not authorizing the electronic access request with the least one processor or in response to the electronic actuator failing to actuate the locking mechanism, receiving at a keyed lock assembly operably installed at the access point of the enclosure, a mechanical key, wherein the mechanical key is keyed to a lock driver of the keyed lock assembly, wherein the keyed lock assembly comprises a lock cylinder, the lock driver operably coupled to the lock cylinder, and a flange extending from a distal end of the lock driver; and rotating, via the mechanical key, the lock driver in a first direction, wherein upon rotating the lock driver in the first direction, the flange is rotated around an axis of the lock driver from a first position to a second position, wherein upon rotating the flange to the second position, the flange is configured to apply force to at least one surface of the electronic lock assembly to actuate the locking mechanism from the locked position to the unlocked position.

The electronic access control method of the present disclosure may be further configured wherein the controller comprises a wireless communications module.

The electronic access control method of the present disclosure may further comprise one or more steps or operations for establishing, with the controller via the wireless communications module, a wireless data transfer interface with the at least one input device, wherein the at least one input device comprises a mobile electronic device.

The electronic access control method of the present disclosure may further comprise one or more steps or operations for establishing, with the controller via the wireless communications module, a wireless data transfer interface with at least one remote server.

The electronic access control method of the present disclosure may be further configured wherein the controller is communicably engaged with at least one alarm system controller via the data transfer interface.

The electronic access control method of the present disclosure may further comprise one or more steps or operations for communicating, with the controller, a first command signal to the at least one alarm system controller in response to rotating the flange from the first position to the second position, wherein the electronic lock assembly comprises a switch or a sensor communicably engaged with the controller and configured to detect one or more position of the flange.

The electronic access control method of the present disclosure may further comprise one or more steps or operations for receiving, with the at least one alarm system controller, the first command signal.

The electronic access control method of the present disclosure may further comprise one or more steps or operations for suppressing, with the at least one alarm system controller, at least one alarm for the access point of the enclosure in response to receiving the first command signal.

The electronic access control method of the present disclosure may further comprise one or more steps or operations for communicating, with the controller, a second command signal to the at least one alarm system controller in response to rotating the flange from the second position to the first position.

The electronic access control method of the present disclosure may further comprise one or more steps or operations for receiving, with the at least one alarm system controller, the second command signal.

The electronic access control method of the present disclosure may further comprise one or more steps or operations for restoring, with the at least one alarm system controller, the at least one alarm for the access point of the enclosure in response to receiving the second command signal.

The electronic access control method of the present disclosure may be further configured wherein the mechanical key further comprises a radio-frequency identification tag comprising digital identification data stored thereon.

The electronic access control method of the present disclosure may further comprise one or more steps or operations for receiving, with the controller via the wireless communications module, the digital identification data stored on the radio-frequency identification tag in response to receiving the mechanical key at the keyed lock assembly.

The electronic access control method of the present disclosure may further comprise one or more steps or operations for communicating, with the controller, the digital identification data to at least one alarm system controller via the data transfer interface.

The electronic access control method of the present disclosure may further comprise one or more steps or operations for receiving, with the at least one alarm system controller, the digital identification data; and processing, with the at least one alarm system controller, the digital identification data to authenticate at least one authorized access device or user associated with the digital identification data.

The electronic access control method of the present disclosure may further comprise one or more steps or operations for suppressing, with the at least one alarm system controller, at least one alarm for the access point of the enclosure in response to authenticating the at least one authorized access device or user associated with the digital identification data.

In accordance with certain aspects of the present disclosure, an illustrative embodiment of an electronic access control system may comprise at least one mobile electronic device and a keyless storage apparatus. The keyless storage apparatus may comprise a housing comprising a top surface, a bottom surface and side walls defining an interior area; an access panel coupled to at least one surface of the housing; a locking assembly configured to selectively establish a locking interface between the access panel and the housing; an electronic actuator configured to actuate a locking mechanism of the locking assembly from a locked state to an unlocked state; and a controller operably engaged with the electronic actuator to command the electronic actuator to actuate the locking mechanism from the locked state to the unlocked state. The controller may comprise a network communications module, a processor communicably engaged with the network communications module, and at least one non-transitory computer readable medium communicably engaged with the processor, the at least one non-transitory computer readable medium comprising instructions stored thereon that, when executed, cause the processor to perform one or more operations, the one or more operations comprising: establishing a wireless data transfer interface with the at least one mobile electronic device via the network communications module; receiving a first wireless communication from the at least one mobile electronic device via the wireless data transfer interface, wherein the first wireless communication comprises electronic access credentials associated with an electronic access request from a user of the at least one mobile electronic device; authenticating the electronic access credentials; and commanding the electronic actuator to actuate the locking mechanism from the locked state to the unlocked state in response to successfully authenticating the electronic access credentials.

The electronic access control system of the present disclosure may further comprise an alarm system controller communicably engaged with the controller via the network communications module.

The electronic access control system of the present disclosure may be further configured wherein the one or more operations of the processor further comprise communicating at least one data signal to the alarm system controller in response to authenticating the electronic access credentials.

The electronic access control system of the present disclosure may be further configured wherein the alarm system controller is configured to suppress an alarm for at least one access point of a secured location in response to receiving the at least one data signal from the controller of the keyless storage apparatus.

The electronic access control system of the present disclosure may further comprise at least one remote server communicably engaged with the controller via the network communications module.

The electronic access control system of the present disclosure may be further configured wherein the one or more operations of the processor further comprise communicating the electronic access credentials from the controller to the at least one remote server via the network communications module.

The electronic access control system of the present disclosure may be further configured wherein the at least one remote server is configured to authenticate the electronic access credentials and communicate an authentication status of the electronic access credentials to the controller via the network communications module.

The electronic access control system of the present disclosure may further comprise at least one physical asset removably housed in the interior area of the keyless storage apparatus, wherein the at least one physical asset comprises a radio-frequency identification tag comprising digital identification data for the at least one physical asset stored thereon.

The electronic access control system of the present disclosure may be further configured wherein the controller of the keyless storage apparatus comprises a radio-frequency antenna communicably engaged with the processor, wherein the radio-frequency antenna is configured to receive a radio-frequency signal comprising the digital identification data from the radio-frequency identification tag.

The electronic access control system of the present disclosure may be further configured wherein the one or more operations of the processor further comprise determining a location status of the at least one physical asset in response to emitting at least one signal from the radio-frequency antenna.

The electronic access control system of the present disclosure may be further configured wherein the one or more operations of the processor further comprise receiving a second wireless communication from the at least one mobile electronic device via the wireless data transfer interface, wherein the second wireless communication comprises a request from the user to actuate the locking mechanism from the unlocked state to the locked state.

The electronic access control system of the present disclosure may be further configured wherein the one or more operations of the processor further comprise commanding the electronic actuator to actuate the locking mechanism from the unlocked state to the locked state according to the location status of the at least one physical asset.

In accordance with certain aspects of the present disclosure, an illustrative embodiment of an electronic access control apparatus may comprise a housing comprising a top surface, a bottom surface and side walls defining an interior area; an access panel coupled to at least one surface of the housing; a locking assembly configured to selectively establish a locking interface between the access panel and the housing; an electronic actuator configured to actuate a locking mechanism of the locking assembly from a locked state to an unlocked state; a controller operably engaged with the electronic actuator to command the electronic actuator to actuate the locking mechanism from the locked state to the unlocked state. The controller may comprise a network communications module, a processor communicably engaged with the network communications module, and at least one non-transitory computer readable medium communicably engaged with the processor, the at least one non-transitory computer readable medium comprising instructions stored thereon that, when executed, cause the processor to perform one or more operations, the one or more operations comprising: establishing a wireless data transfer interface with at least one mobile electronic device via the network communications module; receiving a first wireless communication from the at least one mobile electronic device via the wireless data transfer interface, wherein the first wireless communication comprises electronic access credentials associated with an electronic access request from a user of the at least one mobile electronic device; authenticating the electronic access credentials; and commanding the electronic actuator to actuate the locking mechanism from the locked state to the unlocked state in response to successfully authenticating the electronic access credentials.

The electronic access control apparatus of the present disclosure may be further configured wherein the housing is configured to be mounted to an exterior wall of a building.

The electronic access control apparatus of the present disclosure may be further configured wherein the controller comprises a radio-frequency identification reader communicably engaged with the processor.

The electronic access control apparatus of the present disclosure may be further configured wherein the radio-frequency identification reader comprises a radio-frequency antenna configured to emit an electromagnetic interrogation pulse at a frequency of 13.56 MHz.

The electronic access control apparatus of the present disclosure may be further configured wherein the controller is configured to automatically establish the wireless data transfer interface with the at least one mobile electronic device when the at least one mobile electronic device is positioned within a specified range of the controller.

In accordance with certain aspects of the present disclosure, an illustrative embodiment of an electronic access control method may comprise one or more steps or operations comprising: establishing, with a mobile electronic device, a wireless data transfer interface between the mobile electronic device and a controller of a keyless storage apparatus, wherein the keyless storage apparatus comprises a housing comprising a top surface, a bottom surface and side walls defining an interior area, an access panel coupled to at least one surface of the housing, a locking assembly configured to selectively establish a locking interface between the access panel and the housing, and an electronic actuator configured to actuate a locking mechanism of the locking assembly from a locked state to an unlocked state in response to a command from the controller; communicating, with the mobile electronic device via the wireless data transfer interface, electronic access credentials to the controller of the keyless storage apparatus; receiving, with the controller of the keyless storage apparatus via the wireless data transfer interface, the electronic access credentials; authenticating, with the controller, the electronic access credentials; and commanding, with the controller, the electronic actuator to actuate the locking mechanism from the locked state to the unlocked state in response to successfully authenticating the electronic access credentials.

The electronic access control method of the present disclosure may further comprise one or more steps or operations for communicating, with the mobile electronic device via a network interface, the electronic access credentials to a remote server communicably engaged with the mobile electronic device and the controller of the keyless storage apparatus.

The electronic access control method of the present disclosure may further comprise one or more steps or operations for providing, with the remote server via the network interface, an authentication token to the mobile electronic device in response to successfully authenticating the electronic access credentials at the remote server.

The electronic access control method of the present disclosure may further comprise one or more steps or operations for communicating, with the mobile electronic device via the wireless data transfer interface, the authentication token to the controller of the keyless storage apparatus.

The electronic access control method of the present disclosure may further comprise one or more steps or operations for communicating, with the controller of the keyless storage apparatus via a network interface, at least one data signal to an alarm system controller in response to authenticating the electronic access credentials.

The electronic access control method of the present disclosure may further comprise one or more steps or operations for suppressing, with the alarm system controller, an alarm for at least one access point of a secured location in response to receiving the at least one data signal from the controller of the keyless storage apparatus.

The electronic access control method of the present disclosure may further comprise one or more steps or operations for receiving, with the controller of the keyless storage apparatus, a digital identification data from a radio-frequency identification tag of a physical asset being stored in the interior area of the keyless storage apparatus, wherein the keyless storage apparatus comprises a radio-frequency identification reader communicably engaged with the controller.

The electronic access control method of the present disclosure may further comprise one or more steps or operations for determining, with the controller of the keyless storage apparatus, a location status of the physical asset in response to emitting at least one signal from the radio-frequency identification reader, wherein the radio-frequency identification reader comprises a radio-frequency antenna.

The electronic access control method of the present disclosure may further comprise one or more steps or operations for receiving, with the controller of the keyless storage apparatus via the mobile electronic device or an input device of the keyless storage apparatus, a command to lock the keyless storage apparatus.

The electronic access control method of the present disclosure may further comprise one or more steps or operations for determining, with the controller of the keyless storage apparatus via the radio-frequency identification reader, the physical asset is located in the interior area of the keyless storage apparatus.

The electronic access control method of the present disclosure may further comprise one or more steps or operations for actuating, with the electronic actuator in response to a command signal from the controller, the locking mechanism from the unlocked state to the locked state in response to determining the physical asset is located in the interior area of the keyless storage apparatus.

As will be appreciated by one of skill in the art, one or more aspects of the present disclosure may be embodied as a method (including, for example, a computer-implemented process, a system routine, and/or any other process), an apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random-access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general-purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational phases to be performed on the computer or other programmable apparatus to produce a computer-implemented process such that the code portions which execute on the computer or other programmable apparatus provide phases for implementing the functions/acts specified in the flowchart and/or block diagram block(s). Alternatively, computer program implemented phases or acts may be combined with operator or human implemented phases or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that phases of the processes described herein may be performed in orders different than those illustrated in the flowcharts. In other words, the processes represented by the blocks of a flowchart may, in some embodiments, be performed in an order other than the order illustrated, may be combined or divided, or may be performed simultaneously. It will also be understood that the blocks of the block diagrams illustrate, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

While certain exemplary embodiments have been described and shown in the accompanying drawings, it is to be understood that such embodiments are merely illustrative of, and not restrictive on, the broad invention, and that this invention is not limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. An electronic access control system comprising:

a controller;

an electronic lock assembly operably engaged with the controller, the electronic lock assembly comprising an electronic actuator operably engaged with a locking mechanism configured to selectively restrict access to a door or an access point of an enclosure when the locking mechanism is configured in a locked configuration and selectively enable access to the door or the access point of the enclosure when the locking mechanism is configured in an unlocked configuration, wherein the electronic actuator is configured to actuate the locking mechanism between the locked configuration and the unlocked configuration in response to a command signal from the controller; and a keyed lock assembly comprising a lock cylinder, a keyed lock driver operably coupled to the lock cylinder, and a flange extending from a distal end of the keyed lock driver, wherein the keyed lock driver is configured to receive a mechanical key, wherein the mechanical key comprises an RFID tag storing identification data for the mechanical key, wherein the electronic lock assembly comprises an RFID reader configured to receive a signal from the RFID tag comprising the identification data when the mechanical key is received by the keyed lock driver, wherein the controller is configured to store the identification data in memory in association with a mechanical override event, wherein, upon receiving the mechanical key, the keyed lock driver is configured to rotate the flange around an axis of the lock cylinder, wherein, upon rotating the flange, the flange is configured to operably interface with the electronic lock assembly to disengage the locking mechanism, and wherein the controller is configured to communicate a signal comprising the identification data to at least one alarm system controller.

2. The electronic access control system of claim 1 wherein the controller is configured to receive an electronic access control signal via a data transfer interface and command the electronic actuator to actuate the locking mechanism.

3. The electronic access control system of claim 1 wherein the electronic lock assembly further comprises a switch or a sensor communicably engaged with the controller, wherein the switch or the sensor is configured to detect at least one position of the flange.

4. The electronic access control system of claim 3 wherein the controller is communicably engaged with at least one alarm system controller via a data transfer interface.

5. The electronic access control system of claim 4 wherein the controller is configured to communicate a first signal to the at least one alarm system controller in response to the switch or the sensor detecting a first position of the flange.

6. The electronic access control system of claim 5 wherein the at least one alarm system controller is configured to suppress at least one alarm for the door or the access point of the enclosure in response to the first signal.

7. The electronic access control system of claim 5 wherein the one or more operations of the processor further comprise communicating a second signal to the at least one alarm system controller in response to the switch or the sensor detecting a second position of the flange.

8. The electronic access control system of claim 7 wherein the at least one alarm system controller is configured to restore the at least one alarm for the door or the access point of the enclosure in response to the second signal.

9. The electronic access control system of claim 1 wherein the controller is configured to communicate an override signal to at least one server or networked device in response to the flange disengaging the locking mechanism.

10. An electronic access control apparatus comprising:

an electronic lock assembly comprising a controller, an electronic actuator operably engaged with the controller, a latching mechanism operably engaged with the electronic actuator, and a blocking plate configured to be operably interfaced with a handle of a door or an access point of an enclosure, wherein the electronic actuator is configured to actuate the latching mechanism between a locked position and an unlocked position in response to a command signal from the controller, wherein the blocking plate is configured to be selectively interfaced with the latching mechanism when the latching mechanism is positioned in the locked position such that the blocking plate and the latching mechanism are operably configured to lock the handle of the door or the access point of the enclosure; and a keyed lock assembly comprising a lock cylinder, a keyed lock driver operably coupled to the lock cylinder, and a flange extending from a distal end of the keyed lock driver, wherein the keyed lock driver is configured to receive a mechanical key at a proximal end of the keyed lock driver, wherein the proximal end of the keyed lock driver is configured to be operably installed on an exterior surface of the door or the access point of the enclosure, wherein the mechanical key comprises an RFID tag storing identification data for the mechanical key, wherein the electronic lock assembly comprises an RFID reader configured to receive a signal from the RFID tag comprising the identification data when the mechanical key is received, wherein the controller is configured to store the identification data in memory in association with a mechanical override event, and wherein the controller is configured to communicate a signal comprising the identification data to at least one alarm system controller, wherein, upon receiving the mechanical key, the keyed lock driver is configured to rotate the flange around an axis of the lock cylinder, wherein, upon rotating the flange in a first direction, the flange is configured to apply force to the latching mechanism to position the latching mechanism from the locked position to the unlocked position, wherein the keyed lock driver is key-retaining such that the mechanical key is not removable unless the keyed lock driver is returned to a locked state.

11. The electronic access control apparatus of claim 10 wherein the electronic actuator comprises a solenoid.

12. The electronic access control apparatus of claim 11 wherein the latching mechanism comprises a retractable plunger operably engaged with the solenoid.

13. The electronic access control apparatus of claim 10 wherein the electronic lock assembly comprises a protrusion extending laterally from a surface of the electronic lock assembly.

14. The electronic access control apparatus of claim 13 wherein the flange is configured to operably interface with the protrusion to apply the force to the latching mechanism to position the latching mechanism from the locked position to the unlocked position.

15. The electronic access control apparatus of claim 10 wherein, upon rotating the flange in a second direction, the electronic actuator is configured to position the latching mechanism to the locked position.

16. The electronic access control apparatus of claim 10 wherein the electronic actuator comprises an electric motor comprising at least one gear and a driveline.

17. The electronic access control apparatus of claim 10 wherein the electronic lock assembly further comprises a switch or a sensor communicably engaged with the controller, wherein the switch or the sensor is configured to detect at least one position of the flange when rotated by the keyed lock driver.

18. The electronic access control apparatus of claim 10 wherein the controller is configured to communicate an override signal to at least one server or networked device in response to the flange disengaging the locking mechanism.

19. The electronic access control apparatus of claim 10 wherein the controller is communicably engaged with at least one alarm system controller via a data transfer interface.

20. An electronic access control method comprising:

receiving, with a controller of an electronic lock assembly, an electronic access code from at least one input device via a data transfer interface, wherein the electronic lock assembly is operably installed at an access point of an enclosure and configured to selectively restrict and enable access to the access point of the enclosure, wherein the electronic lock assembly comprises an electronic actuator and a locking mechanism operably engaged with the electronic actuator, wherein the electronic actuator is configured to actuate the locking mechanism between a locked position and an unlocked position in response to a command signal from the controller;

processing, with at least one processor, the electronic access code to authorize an electronic access request for the access point of the enclosure;

commanding, with the controller, the electronic actuator to actuate the locking mechanism from the locked position to the unlocked position in response to authorizing the electronic access request with the least one processor; and in response to not authorizing the electronic access request with the least one processor or in response to the electronic actuator failing to actuate the locking mechanism, receiving at a keyed lock assembly operably installed at the access point of the enclosure, a mechanical key, wherein the mechanical key is keyed to a lock driver of the keyed lock assembly, wherein the keyed lock assembly comprises a lock cylinder, the lock driver operably coupled to the lock cylinder, and a flange extending from a distal end of the lock driver;

receiving, with an RFID reader of the electronic lock assembly, a signal from an RFID tag of the mechanical key comprising identification data for the mechanical key;

storing, with the controller, the identification data in memory in association with a mechanical override event;

communicating, with the controller, a signal comprising the identification data to at least one alarm system controller;

suppressing, with the at least one alarm system controller, an alarm for the enclosure based on the identification data; and rotating, via the mechanical key, the lock driver in a first direction, wherein upon rotating the lock driver in the first direction, the flange is rotated around an axis of the lock driver from a first position to a second position, wherein upon rotating the flange to the second position, the flange is configured to apply force to at least one surface of the electronic lock assembly to actuate the locking mechanism from the locked position to the unlocked position.

* * * * *